US012793015B2

(12) United States Patent
La Placa

(10) Patent No.: US 12,793,015 B2
(45) Date of Patent: Nov. 10, 2026

(54) SYSTEM AND METHOD FOR AUTOMATED MULTI-STAKEHOLDER COORDINATION AND PRIVACY-ENHANCED COLLABORATIVE FINANCIAL PLANNING

(71) Applicant: Intellectus Partners, LLC, San Francisco, CA (US)

(72) Inventor: David J La Placa, San Francisco, CA (US)

(73) Assignee: INTELLECTUS PARTNERS, LLC, San Francisco, CA (US)

( * ) Notice: Subject to any disclaimer, the term of this patent is extended or adjusted under 35 U.S.C. 154(b) by 0 days.

(21) Appl. No.: 19/321,161

(22) Filed: Sep. 5, 2025

(65) Prior Publication Data

US 2026/0004245 A1 Jan. 1, 2026

Related U.S. Application Data

(63) Continuation-in-part of application No. 18/407,415, filed on Jan. 8, 2024, now Pat. No. 12,450,570.

(51) Int. Cl.
*G06Q 10/101* (2023.01)
*G06N 3/044* (2023.01)
(Continued)

(52) U.S. Cl.
CPC .......... *G06Q 10/101* (2013.01); *G06N 3/044* (2023.01); *G06N 3/096* (2023.01);
(Continued)

(58) Field of Classification Search
USPC .......................................................... 705/7.19
See application file for complete search history.

(56) References Cited

U.S. PATENT DOCUMENTS 10,007,757 B2 * 6/2018 Tanner, Jr. ............. G16H 40/20
11,551,321 B1 1/2023 Novati et al.
(Continued)

OTHER PUBLICATIONS

Asghari et al., Task scheduling, resource provisioning, andload balancing on scientific workflows using parallels SARSA reinforcement learning agents and genetic algorithm, Jul. 6, 2020, The Journal of Supercomputing, 2800-2828 (Year: 2020).*

*Primary Examiner* — Allison M Neal
(74) *Attorney, Agent, or Firm* — GALVIN PATENT LAW LLC; Brian R. Galvin; Alec L. Perry

(57) ABSTRACT

A system and method for automated multi-stakeholder coordination and privacy-enhanced collaborative financial planning, comprising a smart scheduling application, task management engine, data fusion suite with automated document processing, machine learning engine utilizing recurrent neural networks, and stakeholder management engine. The system coordinates activities among financial advisors, attorneys, certified public accountants, and family members through role-based access controls and compartmentalized project workspaces. Key features include automated data extraction from unstructured communications, real-time transcription services, client oversight mechanisms, comprehensive audit trails, and end-to-end encryption ensuring regulatory compliance with GDPR, CPRA, and financial industry privacy standards for professional firms and family offices worldwide.

20 Claims, 20 Drawing Sheets

(51) Int. Cl.

| | |
|---|---|
| ***G06N 3/096*** | (2023.01) |
| ***G06Q 10/109*** | (2023.01) |
| ***G06Q 10/1093*** | (2023.01) |
| ***G06Q 40/06*** | (2012.01) |
| ***H04L 9/40*** | (2022.01) |

(52) U.S. Cl.

CPC ..... *G06Q 10/1093* (2013.01); *G06Q 10/1097* (2013.01); *G06Q 40/0631* (2025.08); *H04L 63/0428* (2013.01); *H04L 63/105* (2013.01)

(56) References Cited

U.S. PATENT DOCUMENTS

| | | | | |
|---|---|---|---|---|
| 2006/0053044 | A1 | 3/2006 | Kurian et al. | |
| 2009/0198728 | A1 | 8/2009 | Davia et al. | |
| 2014/0149167 | A1* | 5/2014 | Lo | G06Q 10/06 705/7.21 |
| 2015/0302531 | A1* | 10/2015 | Thier | G06Q 40/10 705/30 |
| 2017/0124531 | A1 | 5/2017 | McCormack | |
| 2017/0357901 | A1 | 12/2017 | La Placa | |
| 2020/0210939 | A1 | 7/2020 | Kolodner et al. | |
| 2022/0028001 | A1* | 1/2022 | Wachell | G06Q 10/101 |
| 2022/0261769 | A1 | 8/2022 | Vellanti | |
| 2022/0358240 | A1* | 11/2022 | Neal | G06F 21/6245 |
| 2023/0077130 | A1* | 3/2023 | Matsuoka | G06F 9/4831 |
| 2024/0370833 | A1 | 11/2024 | Smith et al. | |
| 2025/0259042 | A1* | 8/2025 | Crabtree | G06N 3/047 |

* cited by examiner

SYSTEM AND METHOD FOR AUTOMATED MULTI-STAKEHOLDER COORDINATION AND PRIVACY-ENHANCED COLLABORATIVE FINANCIAL PLANNING

CROSS-REFERENCE TO RELATED APPLICATIONS

Priority is claimed in the application data sheet to the following patents or patent applications, each of which is expressly incorporated herein by reference in its entirety:

Ser. No. 18/407,415

BACKGROUND OF THE INVENTION

Field of the Invention

The disclosure relates to the field of automated task scheduling, multi-party coordination, and collaborative financial planning, and more particularly to the problem of automatically managing and coordinating schedules, deadlines, tasks, notifications, and multi-stakeholder project management for financial service businesses, including systems for automated data extraction from unstructured communications, privacy-enhanced collaborative planning among authorized service providers, real-time communication transcription and integration, client oversight mechanisms, and regulatory compliance frameworks for financial advisors, family offices, and related professional service organizations.

Discussion of the State of the Art

The average Family Office client is frustrated by an inability to have accurate foresight into the ongoing and upcoming activities in their financial life; they have multiple advisors, and constituents that have differing agendas, motivations and knowledge bases. This leads to incredibly complicated and misaligned incentives to coordinate activities and information that is primarily aligned to the customer's benefit and NOT the advisor or third-party provider's benefit. In the end it becomes a task of herding cats, where it is nearly impossible to track and manage both the things that are happening, and the things that are missing but should be happening.

Today it is difficult for a financial advisor to organize all of a client's relevant and timely events and activities that relate to their finances in one easy to use, living application that needs little to no input or effort on the user's part that captures all of the important dates, projects and to-do's. Existing Calendar applications are little more than digital formats of old-fashioned paper calendars. We will use Machine Learning, NLP, decision Trees and administrator input that constantly updates the calendar and to-do lists so that it is timely, relevant, fresh and on time. It will combine the features of a Smart Calendar, To Do lists and Project Management all in one simple to use application.

SUMMARY OF THE INVENTION

Accordingly, the inventor has conceived and reduced to practice, a system for task scheduling and financial planning, comprising: a user profile datastore; a client profile datastore; a user device, such as a smartphone or personal computer; a smart scheduling application comprising at least a first plurality of programming instructions stored in the at least one memory of, and operating on at least one processor of, the computer system, wherein the first plurality of programming instructions, when operating on the at least one processor, cause the computer system to: implement end-to-end encryption protocols for all data transmissions and storage operations; create an initial profile for a user and client with client-controlled access permissions, if a profile for a user or client do not already exist in the user profile datastore or client profile datastore, respectively; save any newly created user or client profile in encrypted datastores; load any existing profile for a user or client involved in usage of the application; receive data of events, obligations, tasks, or notifications, from a data fusion suite, task management engine, or stakeholder management engine; organize the events, obligations, tasks, or notifications, in a calendar-based schedule within compartmentalized project workspaces that prevent cross-contamination of client information; render or export the calendar-based schedule to authorized user devices while maintaining comprehensive audit trails of all data access activities; coordinate multi-party scheduling activities among authorized stakeholders including financial advisors, attorneys, certified public accountants, and family members; provide real-time communication transcription services for collaborative planning sessions; and ensure compliance with applicable privacy regulations including GDPR, CPRA, and financial industry standards; a task management engine comprising at least a second plurality of programming instructions that process data from heterogeneous sources, determine scheduling priorities based on user and client profiles, and coordinate with machine learning and stakeholder management engines; a machine learning engine comprising at least a third plurality of programming instructions that implement recurrent neural networks with temporal pattern recognition, apply genetic programming for optimization, and adapt to user preferences through incremental learning techniques; a stakeholder management engine comprising at least a fourth plurality of programming instructions that implement role-based access controls for authorized parties, maintain compartmentalized project workspaces, provide real-time communication transcription and integration, enable client oversight mechanisms, and generate comprehensive audit trails for regulatory compliance; a data fusion suite comprising at least a fifth plurality of programming instructions that process outgoing requests to external sources, automatically extract scheduling information from unstructured data including emails and documents using optical character recognition and natural language processing, implement privacy protection mechanisms, and ensure secure data transmission between authorized parties.

Additionally, the inventor has conceived and reduced to practice, a method for task scheduling and financial planning, comprising the steps of: implementing end-to-end encryption for all data operations throughout the system; creating initial profiles for users and clients with client-controlled access permissions; maintaining compartmentalized project workspaces that prevent unauthorized cross-contamination of client information; receiving scheduling data from heterogeneous sources including automated extraction from unstructured communications and documents using optical character recognition and natural language processing; implementing a machine learning engine with recurrent neural networks that maintain temporal pattern recognition and apply genetic programming for optimization; coordinating multi-party scheduling activities among authorized stakeholders including financial advisors, attorneys, certified public accountants, and family members through role-based access controls; providing real-time communication transcription services that convert collaborative discussions into searchable text records integrated into client project files; enabling client oversight mechanisms that provide complete transparency into stakeholder collaboration activities; generating comprehensive audit trails of all stakeholder interactions, data access events, and collaborative decisions for regulatory compliance; implementing automated conflict resolution protocols for scheduling disputes among multiple authorized parties; maintaining secure communication channels with adaptive protocol selection and encrypted data pipelines; ensuring compliance with applicable privacy regulations including GDPR, CPRA, and financial industry standards through automated compliance frameworks; coordinating health-related scheduling adjustments with authorized healthcare providers while maintaining HIPAA-compliant data handling procedures; and providing clients with dynamic control over data sharing permissions that can be modified or revoked in real-time while preserving the integrity of ongoing collaborative planning activities.

BRIEF DESCRIPTION OF THE DRAWING FIGURES

The accompanying drawings illustrate several aspects and, together with the description, serve to explain the principles of the invention according to the aspects. It will be appreciated by one skilled in the art that the particular arrangements illustrated in the drawings are merely exemplary, and are not to be considered as limiting of the scope of the invention or the claims herein in any way.

DETAILED DESCRIPTION OF THE INVENTION

Figure 1:
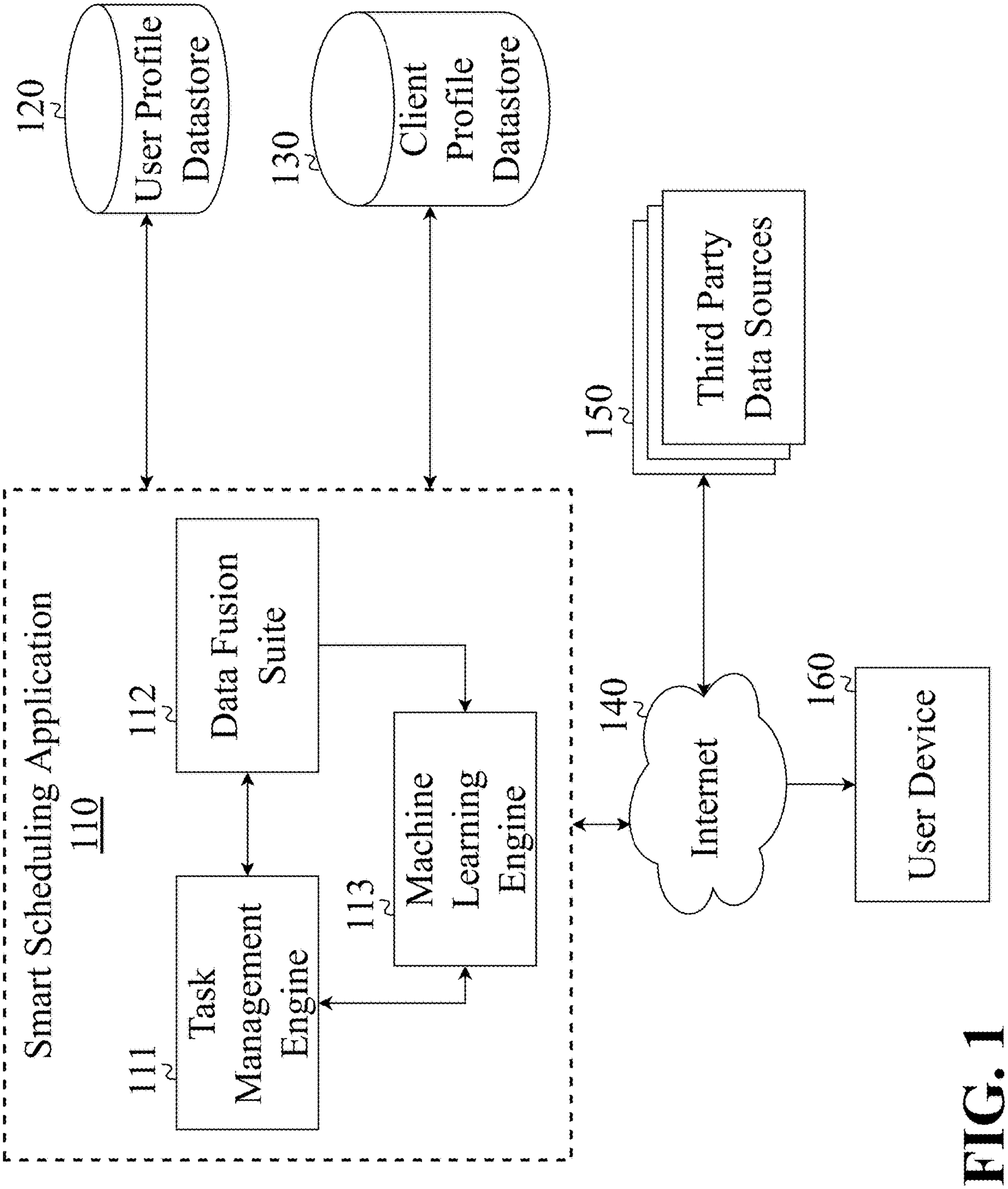
FIG. 1 is a block diagram illustrating an exemplary system architecture for system and method for task scheduling and financial planning, according to one aspect.

The inventor has conceived, and reduced to practice, a system and method for task scheduling and financial planning.

One or more different aspects may be described in the present application. Further, for one or more of the aspects described herein, numerous alternative arrangements may be described; it should be appreciated that these are presented for illustrative purposes only and are not limiting of the aspects contained herein or the claims presented herein in any way. One or more of the arrangements may be widely applicable to numerous aspects, as may be readily apparent from the disclosure. In general, arrangements are described in sufficient detail to enable those skilled in the art to practice one or more of the aspects, and it should be appreciated that other arrangements may be utilized and that structural, logical, software, electrical and other changes may be made without departing from the scope of the particular aspects. Particular features of one or more of the aspects described herein may be described with reference to one or more particular aspects or figures that form a part of the present disclosure, and in which are shown, by way of illustration, specific arrangements of one or more of the aspects. It should be appreciated, however, that such features are not limited to usage in the one or more particular aspects or figures with reference to which they are described. The present disclosure is neither a literal description of all arrangements of one or more of the aspects nor a listing of features of one or more of the aspects that must be present in all arrangements.

Headings of sections provided in this patent application and the title of this patent application are for convenience only, and are not to be taken as limiting the disclosure in any way.

Devices that are in communication with each other need not be in continuous communication with each other, unless expressly specified otherwise. In addition, devices that are in communication with each other may communicate directly or indirectly through one or more communication means or intermediaries, logical or physical.

A description of an aspect with several components in communication with each other does not imply that all such components are required. To the contrary, a variety of optional components may be described to illustrate a wide variety of possible aspects and in order to more fully illustrate one or more aspects. Similarly, although process steps, method steps, algorithms or the like may be described in a sequential order, such processes, methods and algorithms may generally be configured to work in alternate orders, unless specifically stated to the contrary. In other words, any sequence or order of steps that may be described in this patent application does not, in and of itself, indicate a requirement that the steps be performed in that order. The steps of described processes may be performed in any order practical. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to one or more of the aspects, and does not imply that the illustrated process is preferred. Also, steps are generally described once per aspect, but this does not mean they must occur once, or that they may only occur once each time a process, method, or algorithm is carried out or executed. Some steps may be omitted in some aspects or some occurrences, or some steps may be executed more than once in a given aspect or occurrence.

When a single device or article is described herein, it will be readily apparent that more than one device or article may be used in place of a single device or article. Similarly, where more than one device or article is described herein, it will be readily apparent that a single device or article may be used in place of the more than one device or article.

The functionality or the features of a device may be alternatively embodied by one or more other devices that are not explicitly described as having such functionality or features. Thus, other aspects need not include the device itself.

Techniques and mechanisms described or referenced herein will sometimes be described in singular form for clarity. However, it should be appreciated that particular aspects may include multiple iterations of a technique or multiple instantiations of a mechanism unless noted otherwise. Process descriptions or blocks in figures should be understood as representing modules, segments, or portions of code which include one or more executable instructions for implementing specific logical functions or steps in the process. Alternate implementations are included within the scope of various aspects in which, for example, functions may be executed out of order from that shown or discussed, including substantially concurrently or in reverse order, depending on the functionality involved, as would be understood by those having ordinary skill in the art.

Definitions

"Client" is used herein to refer to the clients of a firm, individual, or organization that operates the system described herein. For example, the client may be a client of a financial firm that employs the financial firm as an advisor or manager, the financial firm being the actual primary operator of the system disclosed.

"User" is used herein to refer to any individual or organization who may use or have cause to use the system described herein, which includes financial firms, businesses, and employees of businesses who may use the system, but may also include their clients if the application is used or extended to provide scheduling services or share scheduling and alert data with a non-employee user. In this way, the term "user" may be thought of as a superset that may contain the same entities referred to as "clients", as well as others not referred to as "clients".

"Artificial intelligence" or "AI" as used herein means a computer system or component that has been programmed in such a way that it mimics some aspect or aspects of cognitive functions that humans associate with human intelligence, such as learning, problem solving, and decision-making. Examples of current AI technologies include understanding human speech, competing successfully in strategic games such as chess and Go, autonomous operation of vehicles, complex simulations, and interpretation of complex data such as images and video.

"Machine learning" as used herein is an aspect of artificial intelligence in which the computer system or component can modify its behavior or understanding without being explicitly programmed to do so. Machine learning algorithms develop models of behavior or understanding based on information fed to them as training sets, and can modify those models based on new incoming information. An example of a machine learning algorithm is AlphaGo, the first computer program to defeat a human world champion in the game of Go. AlphaGo was not explicitly programmed to play Go. It was fed millions of games of Go, and developed its own model of the game and strategies of play.

"Neural network" as used herein means a computational model, architecture, or system made up of a number of simple, highly interconnected processing elements which process information by their dynamic state response to external inputs, and is thus able to "learn" information by recognizing patterns or trends. Neural networks, also sometimes known as "artificial neural networks" are based on our understanding of the structure and functions of biological neural networks, such as the brains of mammals. A neural network is a framework for application of machine learning algorithms.

Conceptual Architecture

FIG. 1 is a block diagram illustrating an exemplary system architecture for system and method for task scheduling and financial planning, according to one aspect. A smart scheduling application 110 exists that comprises at least a task management engine 111, data fusion suite 112, and machine learning engine 113, with connections to a user profile datastore 120, client profile datastore 130, and through the internet 140 it also may connect with third party data sources 150 and at least one user device 160, where the user device may be any common end-user device for computing or task tracking or communications, including fitness trackers, digital assistants, laptops, desktops, mobile phones including smartphones, tablets, or other common computing devices. A smart scheduling application 110 may exist on a server or in a cloud architecture in a serverless or elastic configuration, and may maintain connections to separate or external datastores 120, 130, or may have such datastores as internal parts of the server or cloud configuration, or the application's configuration, depending on the implementation and architectural choices made when implementing the invention. It will be obvious to anyone skilled in the art that implementing an internet-capable application has many possible varieties that are currently common, including a browser-based application, a locally executed desktop application, or a mobile phone application, and therefore none of these possible implementations should be considered limiting or novel over the disclosed invention.

A third party data source 150 may be a financial institution such as a bank, stock brokerage, trading platform, credit union or loaning service, data subscription service or feed, news service or publication, or some other third party or external data provider for which any useful scheduling, financial, world-event, or business-related data, may be acquired from. Such a third party data source 150 may be sent requests for up-to-date data from the scheduling application 110, or may be configured to send data updates or livestreaming data to the smart scheduling application 110, depending on the data source and configuration.

A task management engine 111 is a component of a smart scheduling application 110 that manages the actual placement of individual tasks or events or similar, into a set schedule, that is viewable or readable by a user. These tasks may represent meeting dates, earnings dates for businesses, market holidays, tax loss harvesting dates, or any other date relevant to the planning and execution of an investment strategy or financial management strategy for a client or on behalf of a client. A client and user may be the same entity, or separate entities. A machine learning engine 113 is used in tandem with the task management engine 111 and the data fusion suite 112 to handle training of models on a general and per-user and per-client basis, to optimize automated task scheduling, adjusting, and updating, as new data or information is received or released that may be relevant to schedule a new event or task for. The tasks managed by the task management engine 111 may be manually altered, deleted, or added to, and such manual alterations or any user profile preferences for what kinds of tasks or information to pay attention to, are sent to the machine learning engine 113 to update how to handle similar information or tasks that may be received and potentially planned for a user (either for the user as a whole, or for that user when managing a specific client). Such changes may be saved in the user or client profiles, or both, in their respective datastores 120, 130.

A client profile datastore 130 is used for holding profile data including preferences, settings, financial goals, and more, about a client of an entity using or operation the smart scheduling application 110. For instance, a client's preferences for Environmental, Social, and Governance (ESG) stocks for their investment portfolio, stocks or companies in certain industries, or certain kinds of financial assets or real property in specific locations, may be stored in their profile in the datastore 130. Similarly, a user profile datastore 120 stores profile data about a user of the smart scheduling application 110, such as a financial advisor, family office advisor, investment advisor, broker, or business planner operating on behalf of or delivering advice for a client. Data stored in profiles may include data relevant to the operation of a machine learning model by the machine learning engine 113, such as adjustments made to a client's portfolio or a user's schedule that may indicate certain information or tasks should be planned differently when automated planning takes place with the task management engine 111.

Figure 2:
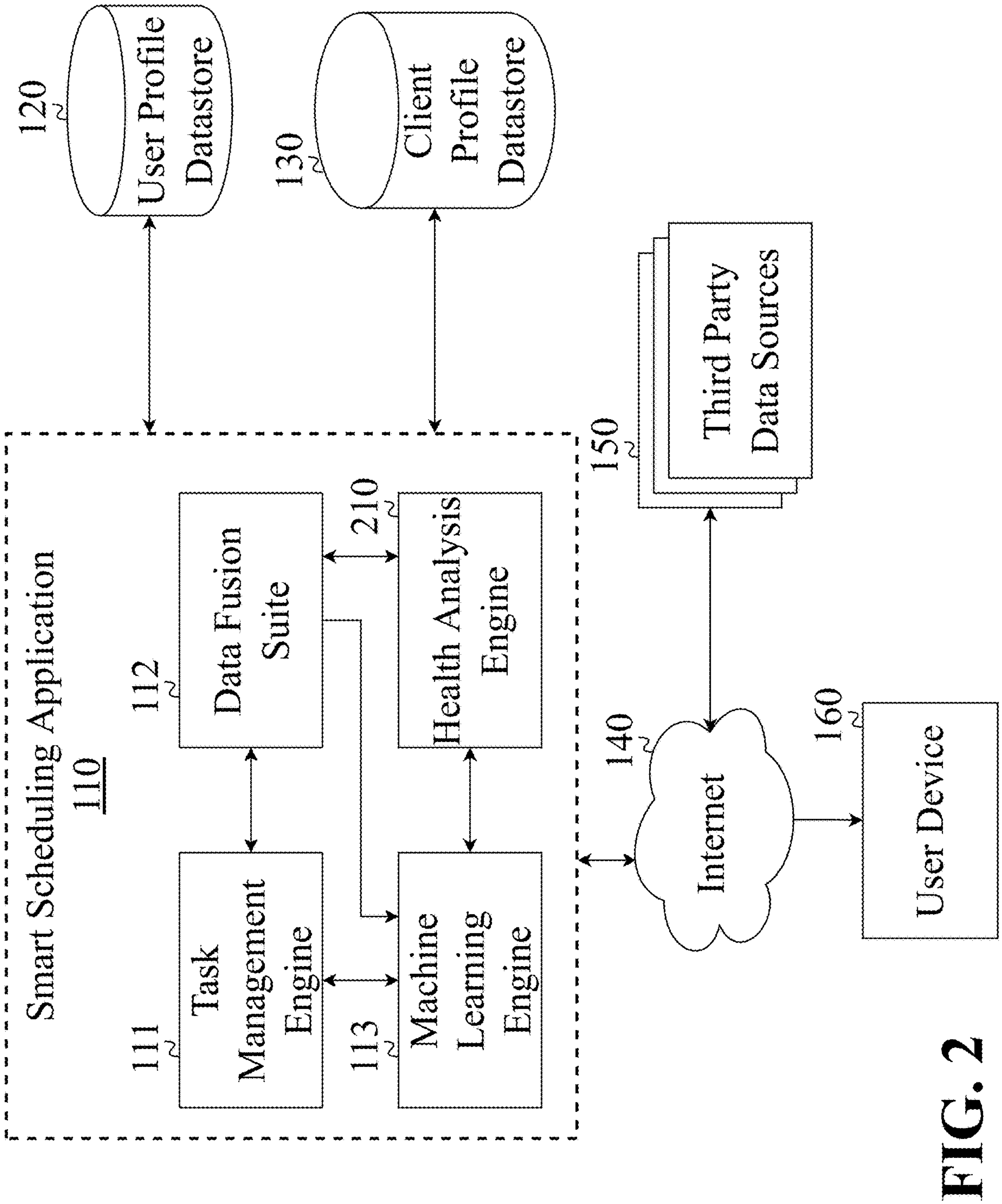
FIG. 2 is a block diagram illustrating an exemplary system architecture for system and method for task scheduling and financial planning, utilizing a health analysis engine, according to one aspect.

FIG. 2 is a block diagram illustrating an exemplary system architecture for system and method for task scheduling and financial planning, utilizing a health analysis engine, according to one aspect. A smart scheduling application 110 exists that comprises at least a task management engine 111, data fusion suite 112, and machine learning engine 113, with connections to a user profile datastore 120, client profile datastore 130, and through the internet 140 it also may connect with third party data sources 150 and at least one user device 160, where the user device may be any common end-user device for computing or task tracking or communications, including fitness trackers, digital assistants, laptops, desktops, mobile phones including smartphones, tablets, or other common computing devices. A smart scheduling application 110 may exist on a server or in a cloud architecture in a serverless or elastic configuration, and may maintain connections to separate or external datastores 120, 130, or may have such datastores as internal parts of the server or cloud configuration, or the application's configuration, depending on the implementation and architectural choices made when implementing the invention. It will be obvious to anyone skilled in the art that implementing an internet-capable application has many possible varieties that are currently common, including a browser-based application, a locally executed desktop application, or a mobile phone application, and therefore none of these possible implementations should be considered limiting or novel over the disclosed invention.

A third party data source 150 may be a financial institution such as a bank, stock brokerage, trading platform, credit union or loaning service, data subscription service or feed, news service or publication, or some other third party or external data provider for which any useful scheduling, financial, world-event, or business-related data, may be acquired from. Such a third party data source 150 may be sent requests for up-to-date data from the scheduling application 110, or may be configured to send data updates or livestreaming data to the smart scheduling application 110, depending on the data source and configuration.

A task management engine 111 is a component of a smart scheduling application 110 that manages the actual placement of individual tasks or events or similar, into a set schedule, that is viewable or readable by a user. These tasks may represent meeting dates, earnings dates for businesses, market holidays, tax loss harvesting dates, or any other date relevant to the planning and execution of an investment strategy or financial management strategy for a client or on behalf of a client. A client and user may be the same entity, or separate entities. A machine learning engine 113 is used in tandem with the task management engine 111 and the data fusion suite 112 to handle training of models on a general and per-user and per-client basis, to optimize automated task scheduling, adjusting, and updating, as new data or information is received or released that may be relevant to schedule a new event or task for. The tasks managed by the task management engine 111 may be manually altered, deleted, or added to, and such manual alterations or any user profile preferences for what kinds of tasks or information to pay attention to, are sent to the machine learning engine 113 to update how to handle similar information or tasks that may be received and potentially planned for a user (either for the user as a whole, or for that user when managing a specific client). Such changes may be saved in the user or client profiles, or both, in their respective datastores 120, 130.

A client profile datastore 130 is used for holding profile data including preferences, settings, financial goals, and more, about a client of an entity using or operation the smart scheduling application 110. For instance, a client's preferences for Environmental, Social, and Governance (ESG) stocks for their investment portfolio, stocks or companies in certain industries, or certain kinds of financial assets or real property in specific locations, may be stored in their profile in the datastore 130. Similarly, a user profile datastore 120 stores profile data about a user of the smart scheduling application 110, such as a financial advisor, family office advisor, investment advisor, broker, or business planner operating on behalf of or delivering advice for a client. Data stored in profiles may include data relevant to the operation of a machine learning model by the machine learning engine 113, such as adjustments made to a client's portfolio or a user's schedule that may indicate certain information or tasks should be planned differently when automated planning takes place with the task management engine 111.

According to an embodiment, a health analysis engine 210 further extends the capabilities of a smart scheduling application 110 while maintaining strict privacy controls over sensitive health information, implementing HIPAA-compliant data handling procedures where applicable, allowing health data from a plurality of fitness-related user devices 160 or data sources 150 to be processed through encrypted channels in combination with existing data from a user profile 120, for purposes of referring health recommendations through a data fusion suite 112 to a task management engine 111 for altering the structure of a schedule of tasks, if health concerns are present. Health data may also be forwarded to the machine learning engine 113 to build or train a model of how the user's health is progressing, or make recommendations based on existing general machine learning models for how to determine certain patterns of health data or behavior that may indicate health concerns, such as staying up and doing work late, having too many meetings in one day, working too many hours in a week, having highly elevated blood pressure and heart rate for long periods of time, or other possible health concerns that may be detected. These determinations of health concerns, if any, may be saved in the user's profile in the user profile datastore 120 so that future task planning from the machine learning engine 113 and task management engine 111 may take existing health concerns into consideration, even if no new concerns arise, to avoid adverse health outcomes for users.

Figure 3:
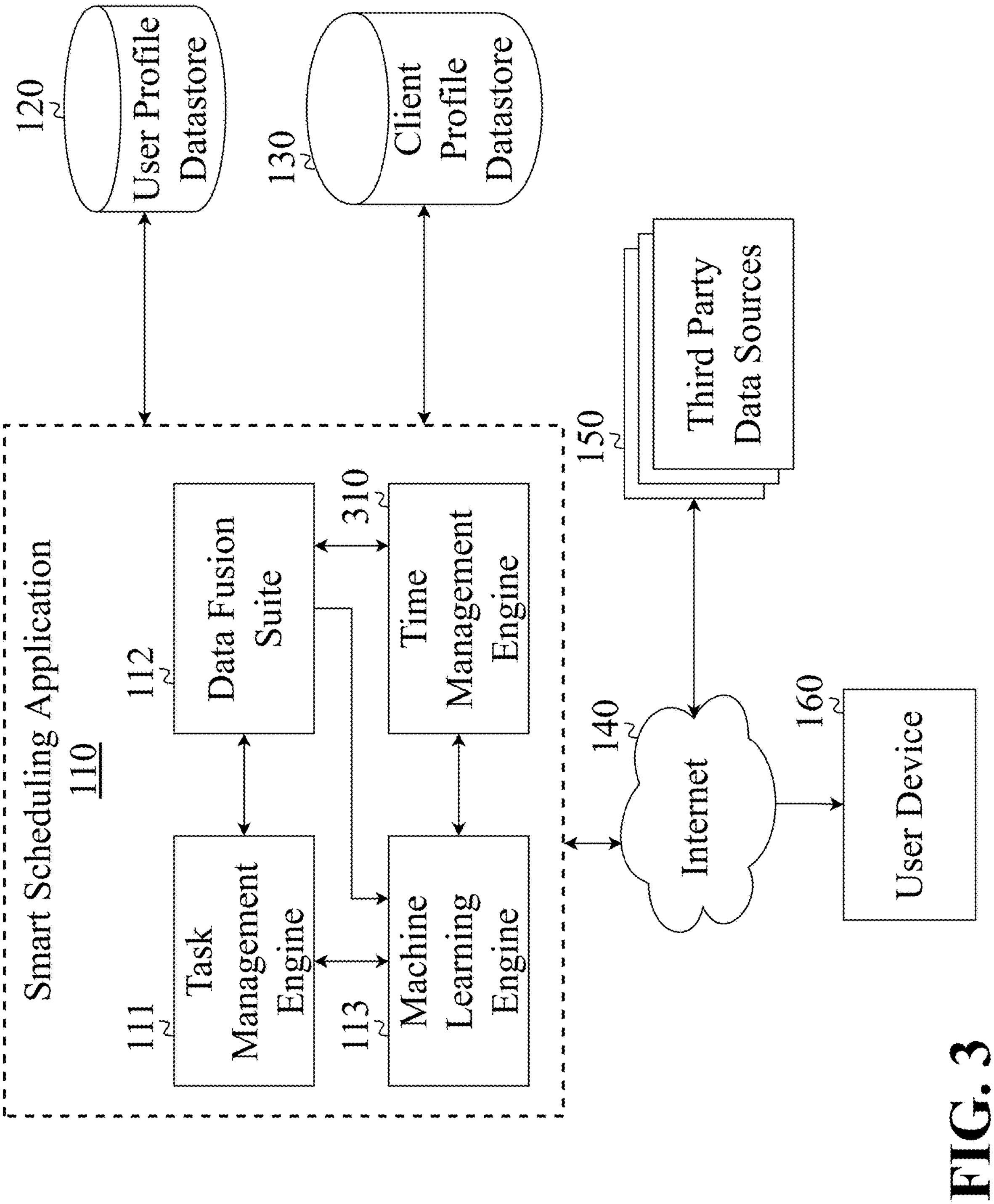
FIG. 3 is a block diagram illustrating an exemplary system architecture for system and method for task scheduling and financial planning, utilizing a time management engine, according to one aspect.

FIG. 3 is a block diagram illustrating an exemplary system architecture for system and method for task scheduling and financial planning, utilizing a time management engine, according to one aspect. A smart scheduling application 110 exists that comprises at least a task management engine 111, data fusion suite 112, and machine learning engine 113, with connections to a user profile datastore 120, client profile datastore 130, and through the internet 140 it also may connect with third party data sources 150 and at least one user device 160, where the user device may be any common end-user device for computing or task tracking or communications, including fitness trackers, digital assistants, laptops, desktops, mobile phones including smartphones, tablets, or other common computing devices. A smart scheduling application 110 may exist on a server or in a cloud architecture in a serverless or elastic configuration, and may maintain connections to separate or external datastores 120, 130, or may have such datastores as internal parts of the server or cloud configuration, or the application's configuration, depending on the implementation and architectural choices made when implementing the invention. It will be obvious to anyone skilled in the art that implementing an internet-capable application has many possible varieties that are currently common, including a browser-based application, a locally executed desktop application, or a mobile phone application, and therefore none of these possible implementations should be considered limiting or novel over the disclosed invention.

A third party data source 150 may be a financial institution such as a bank, stock brokerage, trading platform, credit union or loaning service, data subscription service or feed, news service or publication, or some other third party or external data provider for which any useful scheduling, financial, world-event, or business-related data, may be acquired from. Such a third party data source 150 may be sent requests for up-to-date data from the scheduling application 110, or may be configured to send data updates or livestreaming data to the smart scheduling application 110, depending on the data source and configuration.

A task management engine 111 is a component of a smart scheduling application 110 that manages the actual placement of individual tasks or events or similar, into a set schedule, that is viewable or readable by a user. These tasks may represent meeting dates, earnings dates for businesses, market holidays, tax loss harvesting dates, or any other date relevant to the planning and execution of an investment strategy or financial management strategy for a client or on behalf of a client. A client and user may be the same entity, or separate entities. A machine learning engine 113 is used in tandem with the task management engine 111 and the data fusion suite 112 to handle training of models on a general and per-user and per-client basis, to optimize automated task scheduling, adjusting, and updating, as new data or information is received or released that may be relevant to schedule a new event or task for. The tasks managed by the task management engine 111 may be manually altered, deleted, or added to, and such manual alterations or any user profile preferences for what kinds of tasks or information to pay attention to, are sent to the machine learning engine 113 to update how to handle similar information or tasks that may be received and potentially planned for a user (either for the user as a whole, or for that user when managing a specific client). Such changes may be saved in the user or client profiles, or both, in their respective datastores 120, 130.

A client profile datastore 130 is used for holding profile data including preferences, settings, financial goals, and more, about a client of an entity using or operation the smart scheduling application 110. For instance, a client's preferences for Environmental, Social, and Governance (ESG) stocks for their investment portfolio, stocks or companies in certain industries, or certain kinds of financial assets or real property in specific locations, may be stored in their profile in the datastore 130. Similarly, a user profile datastore 120 stores profile data about a user of the smart scheduling application 110, such as a financial advisor, family office advisor, investment advisor, broker, or business planner operating on behalf of or delivering advice for a client. Data stored in profiles may include data relevant to the operation of a machine learning model by the machine learning engine 113, such as adjustments made to a client's portfolio or a user's schedule that may indicate certain information or tasks should be planned differently when automated planning takes place with the task management engine 111.

According to an embodiment, a time management engine 310 exists as another component of a smart scheduling application 110, which is specifically designed for allowing for custom time budgeting for tasks or categories of tasks, and working with a machine learning engine 113 to optimize the task management and scheduling of tasks to conform to time budgeting rules established by the time management engine 310. For instance, a user may have a rule applied that they may only allocate 10 minutes for catching up with an earnings report and rebalance of a portfolio as a result, which may change the scheduling of tasks within the task management engine 111 when it is forced to allocate a 10 minute window for that event, instead of either a larger or smaller time than it may have originally allocated. In this way, rules and optimizations for time budgeting for users may be applied, for fine-tuning of the automated process of task management and scheduling.

Figure 4:
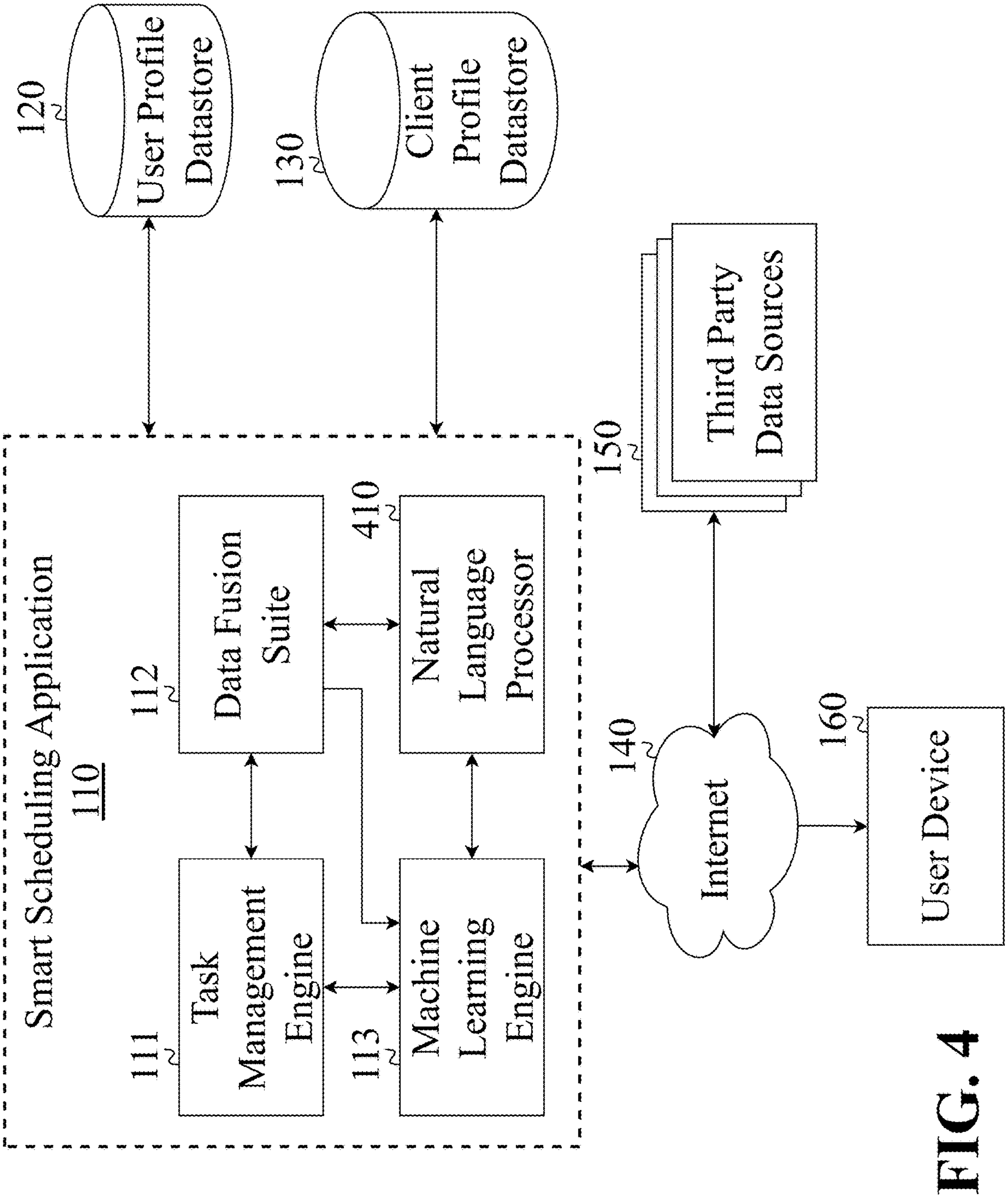
FIG. 4 is a block diagram illustrating an exemplary system architecture for system and method for task scheduling and financial planning, utilizing a natural language processing engine, according to one aspect.

FIG. 4 is a block diagram illustrating an exemplary system architecture for system and method for task scheduling and financial planning, utilizing a natural language processing engine, according to one aspect. A smart scheduling application 110 exists that comprises at least a task management engine 111, data fusion suite 112, and machine learning engine 113, with connections to a user profile datastore 120, client profile datastore 130, and through the internet 140 it also may connect with third party data sources 150 and at least one user device 160, where the user device may be any common end-user device for computing or task tracking or communications, including fitness trackers, digital assistants, laptops, desktops, mobile phones including smartphones, tablets, or other common computing devices. A smart scheduling application 110 may exist on a server or in a cloud architecture in a serverless or elastic configuration, and may maintain connections to separate or external datastores 120, 130, or may have such datastores as internal parts of the server or cloud configuration, or the application's configuration, depending on the implementation and architectural choices made when implementing the invention. It will be obvious to anyone skilled in the art that implementing an internet-capable application has many possible varieties that are currently common, including a browser-based application, a locally executed desktop application, or a mobile phone application, and therefore none of these possible implementations should be considered limiting or novel over the disclosed invention.

A third party data source 150 may be a financial institution such as a bank, stock brokerage, trading platform, credit union or loaning service, data subscription service or feed, news service or publication, or some other third party or external data provider for which any useful scheduling, financial, world-event, or business-related data, may be acquired from. Such a third party data source 150 may be sent requests for up-to-date data from the scheduling application 110, or may be configured to send data updates or livestreaming data to the smart scheduling application 110, depending on the data source and configuration.

A task management engine 111 is a component of a smart scheduling application 110 that manages the actual placement of individual tasks or events or similar, into a set schedule, that is viewable or readable by a user. These tasks may represent meeting dates, earnings dates for businesses, market holidays, tax loss harvesting dates, or any other date relevant to the planning and execution of an investment strategy or financial management strategy for a client or on behalf of a client. A client and user may be the same entity, or separate entities. A machine learning engine 113 is used in tandem with the task management engine 111 and the data fusion suite 112 to handle training of models on a general and per-user and per-client basis, to optimize automated task scheduling, adjusting, and updating, as new data or information is received or released that may be relevant to schedule a new event or task for. The tasks managed by the task management engine 111 may be manually altered, deleted, or added to, and such manual alterations or any user profile preferences for what kinds of tasks or information to pay attention to, are sent to the machine learning engine 113 to update how to handle similar information or tasks that may be received and potentially planned for a user (either for the user as a whole, or for that user when managing a specific client). Such changes may be saved in the user or client profiles, or both, in their respective datastores 120, 130.

A client profile datastore 130 is used for holding profile data including preferences, settings, financial goals, and more, about a client of an entity using or operation the smart scheduling application 110. For instance, a client's preferences for Environmental, Social, and Governance (ESG) stocks for their investment portfolio, stocks or companies in certain industries, or certain kinds of financial assets or real property in specific locations, may be stored in their profile in the datastore 130. Similarly, a user profile datastore 120 stores profile data about a user of the smart scheduling application 110, such as a financial advisor, family office advisor, investment advisor, broker, or business planner operating on behalf of or delivering advice for a client. Data stored in profiles may include data relevant to the operation of a machine learning model by the machine learning engine 113, such as adjustments made to a client's portfolio or a user's schedule that may indicate certain information or tasks should be planned differently when automated planning takes place with the task management engine 111.

According to an embodiment, a natural language processor 410 such as an advanced language model for responding to human-language queries or sentences, may be provided as part of a smart scheduling application 110. The natural language processor may take the place of a traditional user interface for calendaring or scheduling applications that may normally have a visual interface, and instead allow users or clients to communicate with the scheduling and task management by sending text or speech-to-text communications to the system, including but not limited to Short Message Service ("SMS") messages, email, chat messages from a web or application interface, social media messages over a social network, voicemail or phone calls, or other methods of transmitting human-language queries. The scheduling application may make alterations or adjustments to the schedule of a user based on the communications received from the natural language processor 410, and report upcoming tasks or events, or report back an entire section of the schedule, to a user, if requested.

DETAILED DESCRIPTION OF EXEMPLARY ASPECTS

Figure 5:
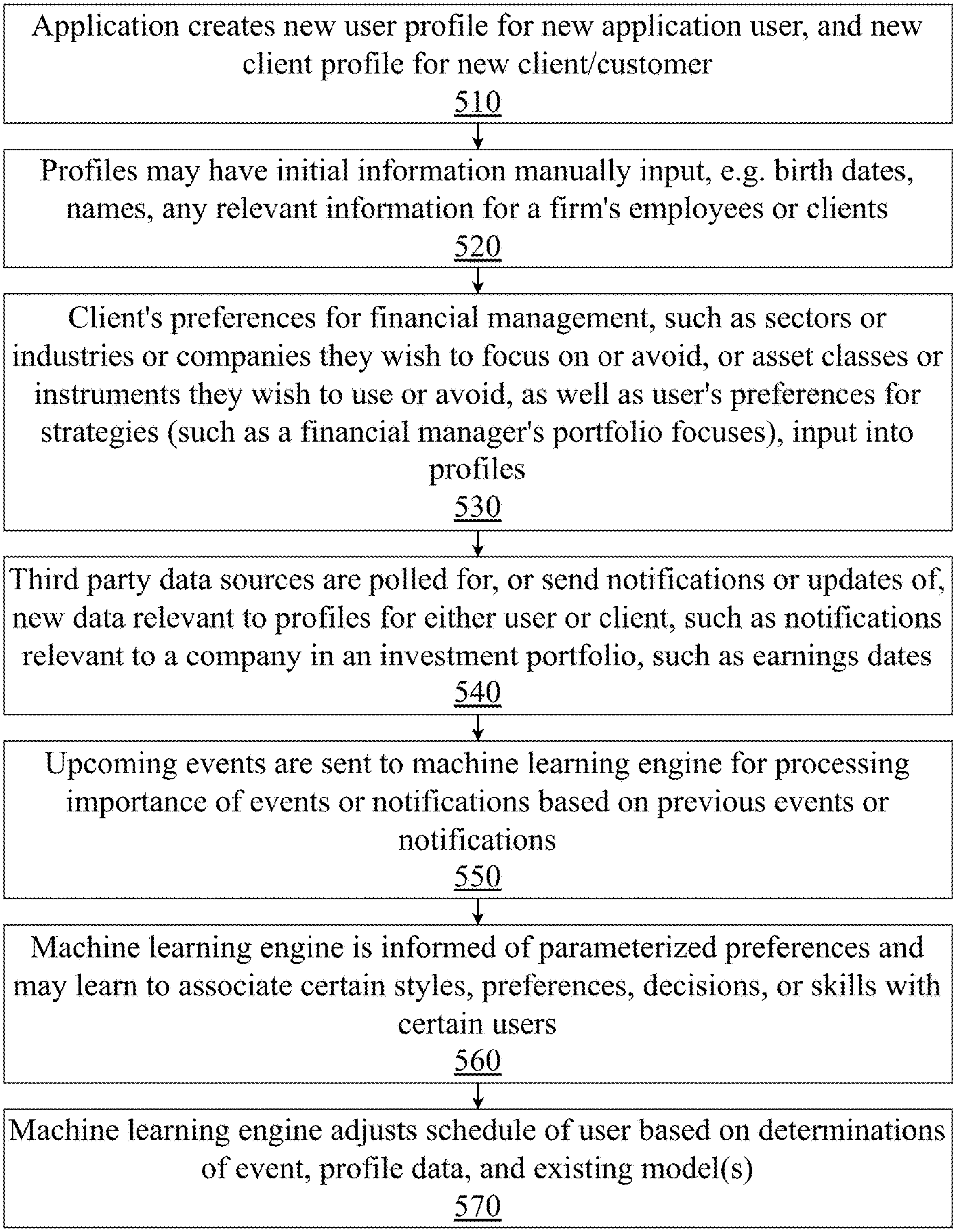
FIG. 5 is a flow diagram illustrating an exemplary method for system architecture for system and method for task scheduling and financial planning, specifically the process of fusing multiple data sources and any existing profile or schedule data to alert users of financial events or information, according to one aspect.

FIG. 5 is a flow diagram illustrating an exemplary method for system architecture for system and method for task scheduling and financial planning, specifically the process of fusing multiple data sources and any existing profile or schedule data to alert users of financial events or information, according to one aspect.

First, the smart scheduling application may create a new user profile for a new application user, and if applicable, a new client profile as well, for a new client or customer 510. Either profile may forego being created if they already exist for a given user or client, and instead, they may simply be marked as being paired in their respective profiles, rather than being created together. This pairing or corresponding of profiles (such as a financial manager as the user of the application, and a client whose funds or investments they manage) may be part of a subsequent step of having new profiles enter their relevant information, such as birth dates, names, business information, investment or financial data that may be relevant for the usage of the application, and more 520.

A client's preferences for financial management, if any, such as sectors or industries or companies they wish to focus on or avoid, asset classes or instruments they wish to use or avoid, as well as user's preferences for strategies (such as a financial manager's portfolio focuses), or any other information such as financial or investment goals or even ESG requirements they personally adhere to, may be input into a new client profile 530, as part of setting up the necessary data to allow for the scheduling application to automatically schedule tasks or deadlines or similar that may be relevant to a client.

Third party data sources may then be polled for, or proactively send notifications or updates of, new data relevant to the client or user based on their profiles, such as notifications relevant to a company in an investment portfolio including earnings dates 540. Other scheduling data may be received or even locally calculated or planned for, such as important dates for tax loss harvesting or for capital gains tax rules to be applied before being able to sell certain assets, as the case may be for an individual client's financial situation.

When data or possible upcoming events are received or detected, any new information and events are sent to a machine learning engine for processing of the importance (or even the likelihood of occurrence) of events or notifications based on previous events or notifications 550. For instance, if a user has chosen before to ignore notifications of earnings statements for some reason from a given company, but not from others, then those announcements or dates may be filtered out by the machine learning engine in the future and not scheduled for the user to pay attention to.

The machine learning engine may also be informed of parameterized preferences for a user or client, and may learn to associate certain styles, preferences, decisions, or skills with certain users 560, such as some users having a preference or keen ability for short duration derivatives trading, pairs trading, or other strategies and financial management techniques. Data relevant to such formats of financial management may then be given higher priority for scheduling events or notifying users of data or changes that the system is made aware of, including market fluctuations or market events, or news events that may match certain keywords in news feeds that may be polled. The machine learning engine then may adjust the schedule of a user based on these determinations of events and event-related data, the user and client profile data, and existing machine learning models, if any 570, to provide for partially automated and optimized scheduling for financial management entities and their clients.

Figure 6:
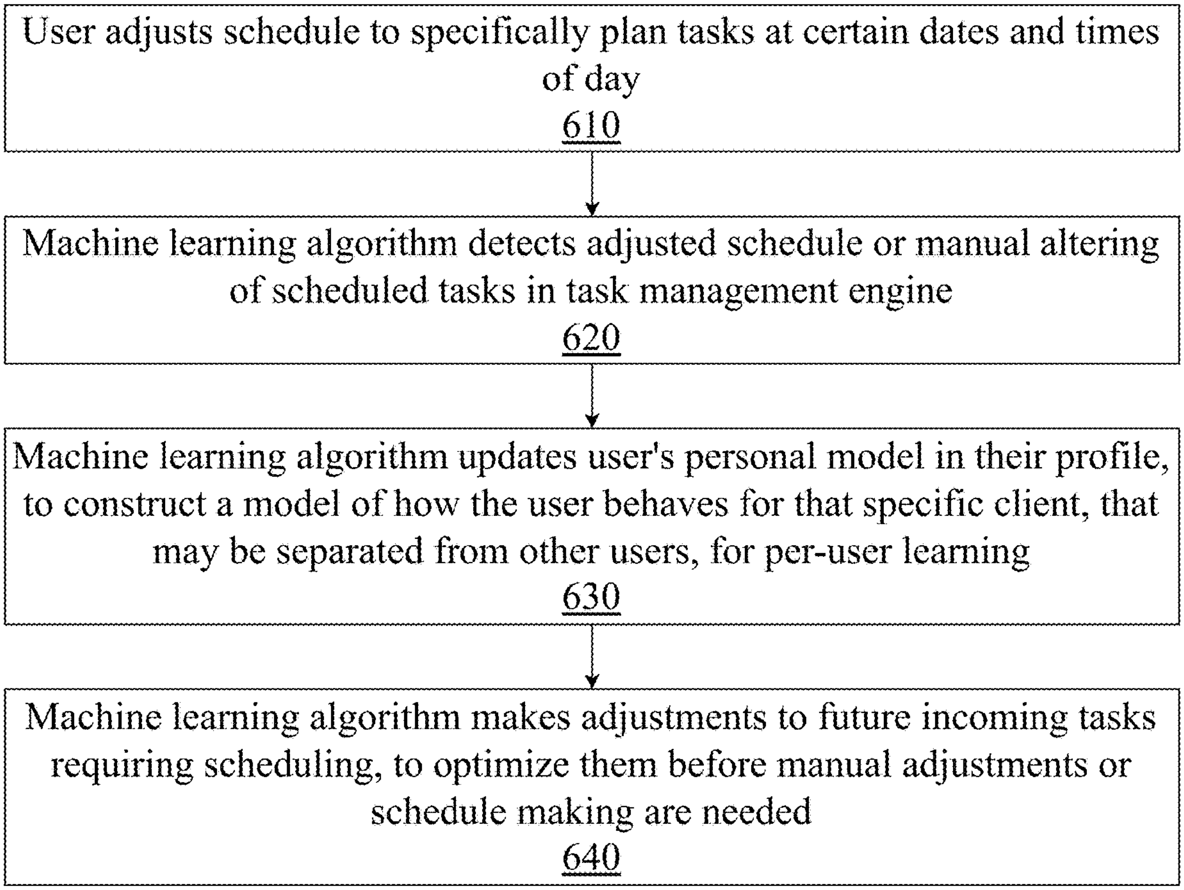
FIG. 6 is a flow diagram illustrating an exemplary method for system architecture for system and method for task scheduling and financial planning, specifically the process of using a task management engine to prioritize user tasks and scheduling using a machine learning engine and profile data in tandem with other scheduled tasks or events, according to one aspect.

FIG. 6 is a flow diagram illustrating an exemplary method for system architecture for system and method for task scheduling and financial planning, specifically the process of using a task management engine to prioritize user tasks and scheduling using a machine learning engine and profile data in tandem with other scheduled tasks or events, according to one aspect.

A user may adjust an already created or optimized schedule to specifically plan tasks at certain dates and times of day 610, such as moving tasks around, deleting some, or adding others. It is not truly possible to provide a completely optimized and perfect schedule based on automated rules even with machine learning algorithms, so users may choose to alter their schedule as they see fit to cope with real world conditions, which may not even be market related (for instance, an illness or personal crisis that takes them away from the office for an extended period of time).

If and when alterations are made to a schedule or user profile, the machine learning engine is informed of these adjustments to the schedule or manual altering of scheduled tasks in a task management engine 620, and the machine learning engine may then update the user's personal model or data related to the execution of a ML model in their profile, to construct or refine a model of how the user behaves both in general and for a specific client, that may be separated from other users, for per-user learning 630.

When adjustments are made and new data is saved to the user profile, the machine learning engine then may make adjustments to future incoming tasks requiring scheduling, to optimize them before manual adjustments or schedule making are needed 640, such as already filtering out unwanted tasks or information that a user continues to remove from their schedule whenever it's scheduled by the system.

Figure 7:
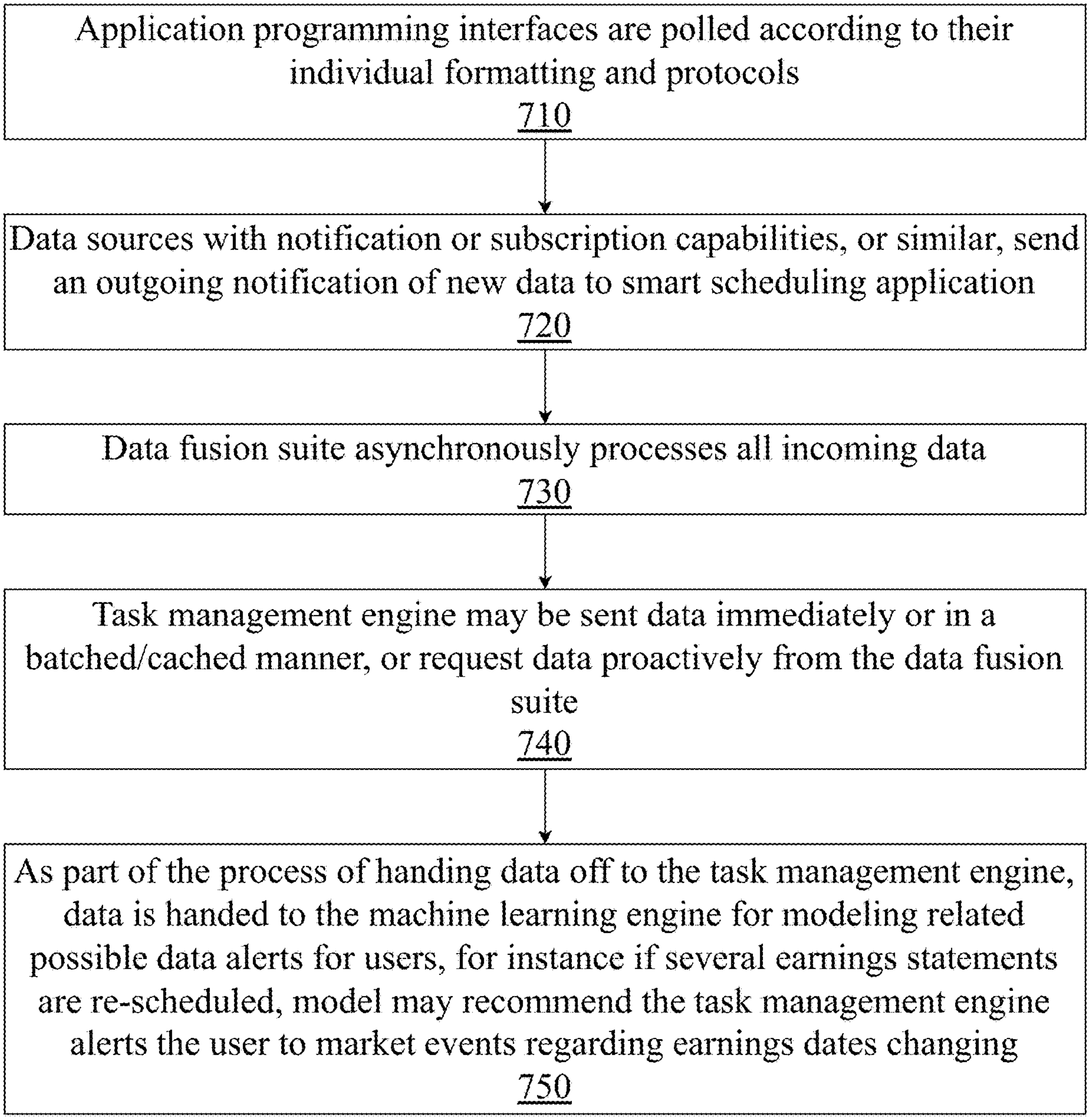
FIG. 7 is a flow diagram illustrating an exemplary method for system architecture for system and method for task scheduling and financial planning, specifically the process of heterogeneous data collection from multiple application programming interfaces and datastores being fused or synthesized into a machine learning engine and task management engine, according to one aspect.

FIG. 7 is a flow diagram illustrating an exemplary method for system architecture for system and method for task scheduling and financial planning, specifically the process of heterogeneous data collection from multiple application programming interfaces and datastores being fused or synthesized into a machine learning engine and task management engine, according to one aspect.

Any application programming interfaces ("API") that are known and integrated with the smart scheduling application are polled according to their individual formatting and protocols 710. For instance, many trading brokerages have their own API for communicating with the brokerage on a software level, allowing for the access of account information, placing, editing, or canceling orders and trades, movement of funds, acquisition of market data, and more, and these APIs frequently are formatted or designed independently of one another and have their own specifications. Many such APIs may have client libraries written for the smart scheduling application to "plug in" to a possible multitude of different data sources from which to gather data. This manner of utilizing web clients and APIs in software is well known in the art and may be handled in numerous fashions such as interfaces and polymorphic objects in some programming languages.

Any data sources with notification or subscription capabilities, or similar, such as newsfeeds or market data feeds that may communicate over continuous socket-level communications, may send outgoing data to the smart scheduling application 720 rather than being polled for data or having a new request for data be sent from the application to the data source. Examples of this include RSS feeds or, on a more basic level, even emails sent to a web server, in this case the recipient being the smart scheduling application (or some connected mail server).

A data fusion suite asynchronously processes all incoming data 730, which may include multithreading to handle numerous data streams at once, but may also simply involve asynchronous programming whereby, in some software paradigms, the software is treated as a state machine that simply continues to gather or ingest data as fast as possible until some computation that requires or requests the data is performed, allowing for "asynchronous" programming. Numerous methods for speedily handling the ingestion of data from multiple sources without blocking other operations exist, including the use of specialized data streaming frameworks and platforms such as APACHE KAFKA™.

A task management engine may then be sent data immediately or in a batched/cached manner from the data fusion suite, or the task management engine may request data itself from the data fusion suite 740, depending on the state of the software and the method of handling the data streams. As part of the process of handing data off to the task management engine, data is handed to the machine learning engine for modeling related possible data alerts for users, for instance if several earnings statements have been re-scheduled according to incoming data streams, the model may recommend the task management engine alerts the user to market events regarding earnings dates changing 750. Similarly, the machine learning engine may at this point filter out or remove from the task management engine, any tasks that the user may not actually be interested in, due to previously removing them or marking them as unimportant or undesired in the schedule.

According to an embodiment, the data fusion suite 740 further comprises a document processing engine that automatically extracts scheduling-relevant information from unstructured data sources including emails, text messages, portable document format (PDF) files, images, and scanned documents. This document processing engine utilizes optical character recognition (OCR) technology in combination with natural language processing algorithms to identify and parse calendar events, payment due dates, meeting invitations, invoice information, contract deadlines, and other time-sensitive obligations from communications and documents that may be received through a plurality of channels including email servers, messaging applications, cloud storage services, and directly uploaded files. The document processing engine applies machine learning models trained to recognize financial terminology, legal language, and scheduling-related contexts to automatically categorize and prioritize extracted information based on urgency and relevance to specific users and clients.

The data fusion suite 740 additionally includes a multi-stakeholder coordination framework that manages access control and data sharing among authorized parties involved in client financial management, including but not limited to financial advisors, certified public accountants, attorneys, estate planners, family members, and other designated service providers. This coordination framework implements role-based permission systems that allow a primary financial advisor or client to grant granular access levels to specific project data, communications, and scheduling information while maintaining comprehensive audit trails of all stakeholder interactions. The framework further includes real-time communication transcription services that can process audio from phone calls, video conferences, and in-person meetings, converting spoken discussions into searchable text records that are automatically integrated into client project files and made accessible to authorized parties based on predetermined permission levels.

To ensure data privacy and regulatory compliance, the data fusion suite 740 incorporates end-to-end encryption protocols for all data transmission and storage operations, with client-controlled data sharing permissions that can be dynamically modified or revoked. The suite maintains compartmentalized project workspaces that prevent cross-contamination of confidential client information while enabling authorized collaborative planning sessions. Communication channels within the system utilize secure, encrypted messaging protocols that comply with financial industry privacy regulation including but not limited to the Gramm-Leach-Bliley Act (GLBA), ensuring that sensitive financial and personal information remains protected during multi-party coordination activities while providing clients with complete visibility into all advisor communication and planning discussions related to their financial management.

The data fusion suite 112 incorporates comprehensive privacy protection mechanisms that ensure all data processing activities comply with applicable privacy regulations and maintain strict confidentiality controls. All incoming data from third-party sources is processed through secure, encrypted channels and stored in compartmentalized data structures that prevent unauthorized cross-referencing between different clients and users. The data fusion suite 112 implements automated data minimization protocols that ensure only necessary information is retained and processed, with automated deletion of expired or irrelevant data according to configurable retention policies. Data anonymization and pseudonymization techniques are applied where appropriate to protect individual privacy while maintaining analytical utility for machine learning and scheduling optimization purposes. The data fusion suite maintains detailed processing logs that document all data transformation, aggregation, and distribution activities for regulatory compliance and audit purposes.

Figure 8:
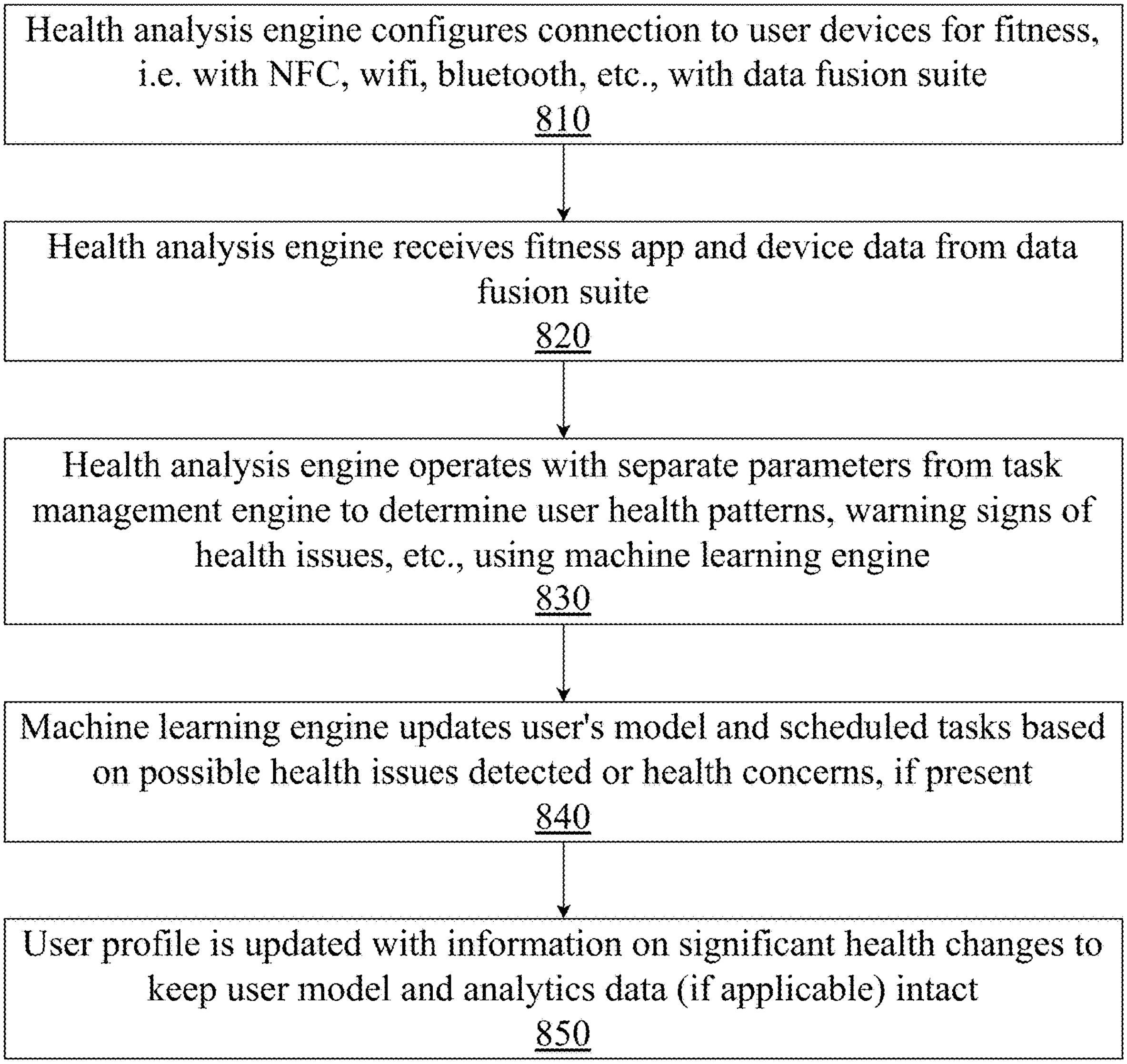
FIG. 8 is a flow diagram illustrating an exemplary method for system architecture for system and method for task scheduling and financial planning with the addition of a health analysis engine, according to one aspect.

FIG. 8 is a flow diagram illustrating an exemplary method for system architecture for system and method for task scheduling and financial planning with the addition of a health analysis engine, according to one aspect.

A health analysis engine may configure and maintain a connection to a plurality of user devices for fitness and health tracking or monitoring such as FITBIT™ or APPLE WATCH™ devices, with Near-Field Communications ("NFC"), WIFI™, BLUETOOTH™, or over a direct internet connection without any local connectivity required, with a data fusion suite 810. Such connections are well established with fitness and health monitoring devices, and the connections may be implemented and configured individually for each type or model of device, depending on the implementation of the software of such devices, similar to building multiple different API clients to connect to several different (but ultimately similar) stock brokerages.

A health analysis engine may then receive fitness or health monitoring app and device data from the data fusion suite 820 once the connection(s) are configured and set up.

The health analysis engine then operates with separate parameters from the task management engine to determine user health patterns, warning signs of health issues, etc., using a machine learning engine 830. For instance, the health analysis engine may be pre-programmed or hard-coded with numerous criteria for health warning signs including high heart rates or blood pressure, or it may learn from a user's health data what to watch out for using a machine learning engine, at which point if health issues or health concerns are detected, the machine learning engine may modify the task management engine's scheduling to accommodate a change necessary to improve user health 840. For example, attending too many meetings in a day, or having too many hours of tasks and things to pay attention to without any breaks, which may be correlated by the machine learning engine with increased blood pressure and heart rate, or worsening sleep patterns that may impact user performance.

The user's profile is then updated with information on any significant health changes the have, and the adjustments made in light of the health information, to keep the user's ML model and any analytics data (if applicable) intact 850 and usable for optimizing their task scheduling with regards to their health and long term performance.

Figure 9:
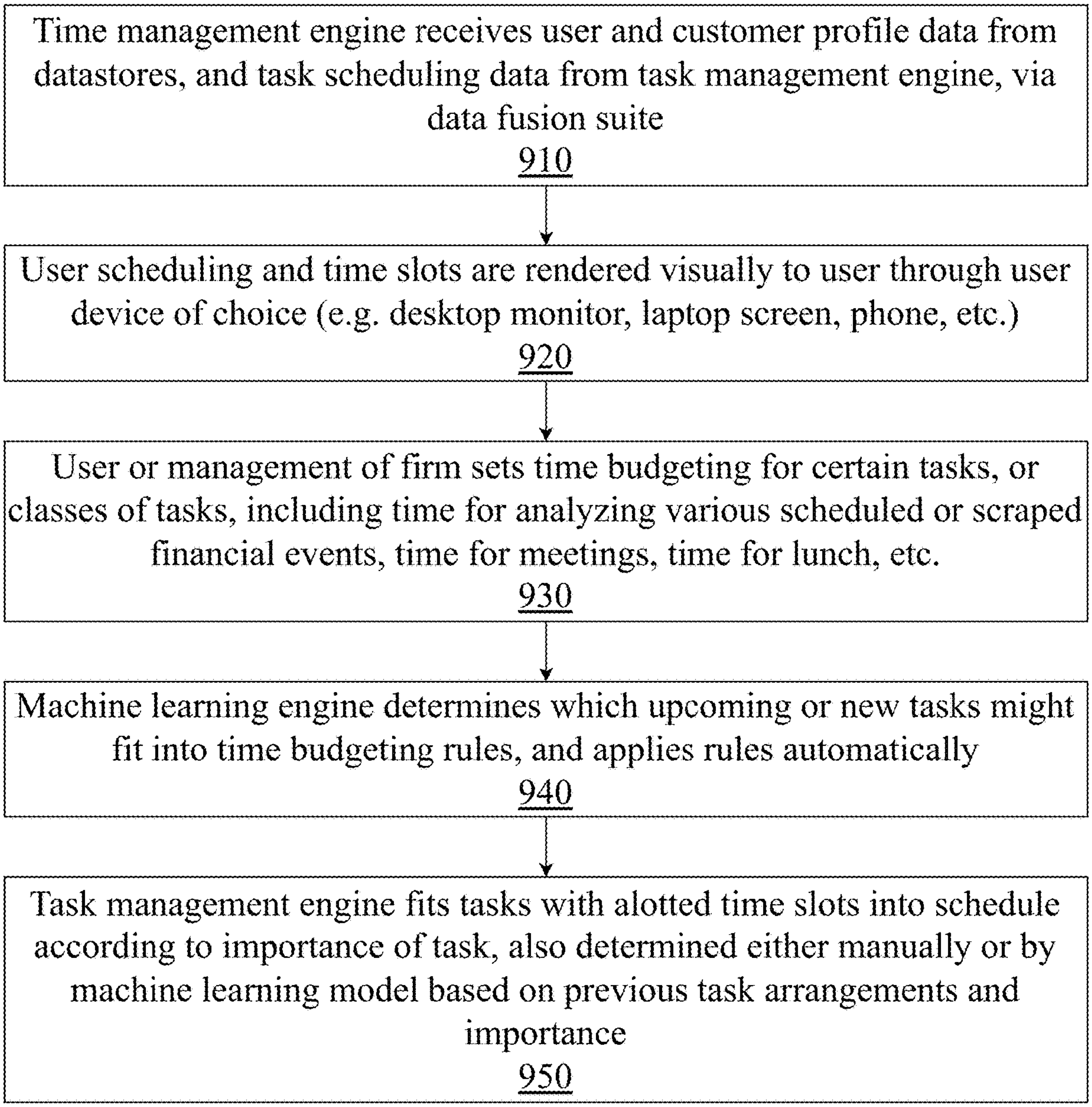
FIG. 9 is a flow diagram illustrating an exemplary method for system architecture for system and method for task scheduling and financial planning with the addition of a time management engine for fine-tuned user time management for a firm, according to one aspect.

FIG. 9 is a flow diagram illustrating an exemplary method for system architecture for system and method for task scheduling and financial planning with the addition of a time management engine for fine-tuned user time management for a firm, according to one aspect.

A time management engine may receive user and customer profile data from a datastore or multiple datastores, and task scheduling data from a task management engine, via a data fusion suite 910. This data may be requested manually by the time management engine, or automatically fed into the time management engine by the smart scheduling application.

A user's scheduling and available time slots may be rendered visually or textually to the user through a user device of choice (e.g. desktop monitor, laptop screen, phone, etc.) 920. This is common in the art for any number of scheduling or calendar apps, in various formats and designs.

A user or their possible manager or employer, may set time budgeting constraints for certain tasks, or classes of tasks, including a budget for time spent analyzing various scheduled or scraped financial events, time budgeted for meetings, time budgeted for lunch or breaks, etc. 930, allowing human-specified time budgeting and rules to influence the task scheduling.

A machine learning engine then may determine which upcoming or new tasks might fit into a user's schedule while obeying any time budgeting rules, and apply the rules automatically 940 as data for task planning feeds into the machine learning engine and task management engine.

A task management engine then fits tasks with time budgeting constraints into the schedule according to the importance of each task, as determined either manually from user preferences, or by the machine learning model based on previous task arrangements and importance 950. For example, if a user consistently bumps up or spends more time on tax planning meetings for a client, those may be given priority for a competitive timeslot in their schedule that might be desired for multiple tasks.

Figure 10:
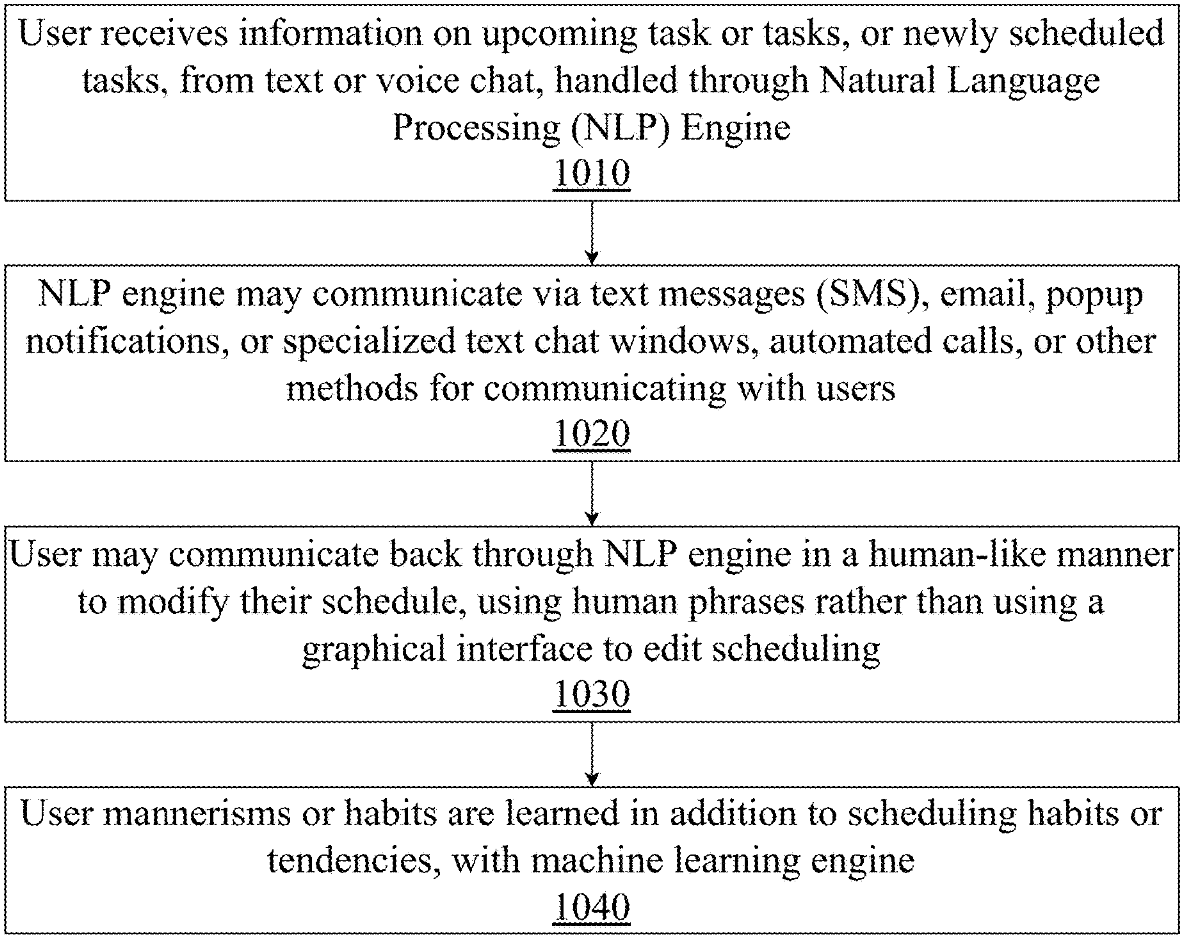
FIG. 10 is a flow diagram illustrating an exemplary method for system architecture for system and method for task scheduling and financial planning with the addition of a natural language processing engine to allow users to interact with the system in a human-like manner, according to one aspect.

FIG. 10 is a flow diagram illustrating an exemplary method for system architecture for system and method for task scheduling and financial planning with the addition of a natural language processing engine to allow users to interact with the system in a human-like manner, according to one aspect.

A user may receive information on an upcoming task or tasks, or newly scheduled tasks, from text or voice chat, handled through Natural Language Processing ("NLP") Engine 1010. For example a new task may be scheduled for them, and they receive a text message on their phone alerting them to the task, or a chatbox opens on the application to alert them and allow them to interact in a human readable manner further with the software 1020. Several possible manners to alert users to changes via text may be obvious including popup notifications, PUSH notifications, voicemails or emails, and more.

The user may communicate back to the system, possibly but not necessarily through the same medium, with the NLP engine in a human-readable manner to modify their schedule, using human phrases rather than using a graphical interface to edit scheduling 1030. For example, a user may receive a text message saying, "Hey John, you have an appointment scheduled in 30 minutes for analyzing the new 10-K filing from Company ABC", to which a user could respond, "Hey, move that back 30 minutes if possible, I can't make it at the scheduled time", at which point the system would attempt to reschedule the event according to the user's wishes. In these instances, as a user continues to use the NLP functionality of the software, their mannerisms or habits of speech are processed in the machine learning engine and learned by the system to improve communication and accuracy of results 1040.

Figure 11:
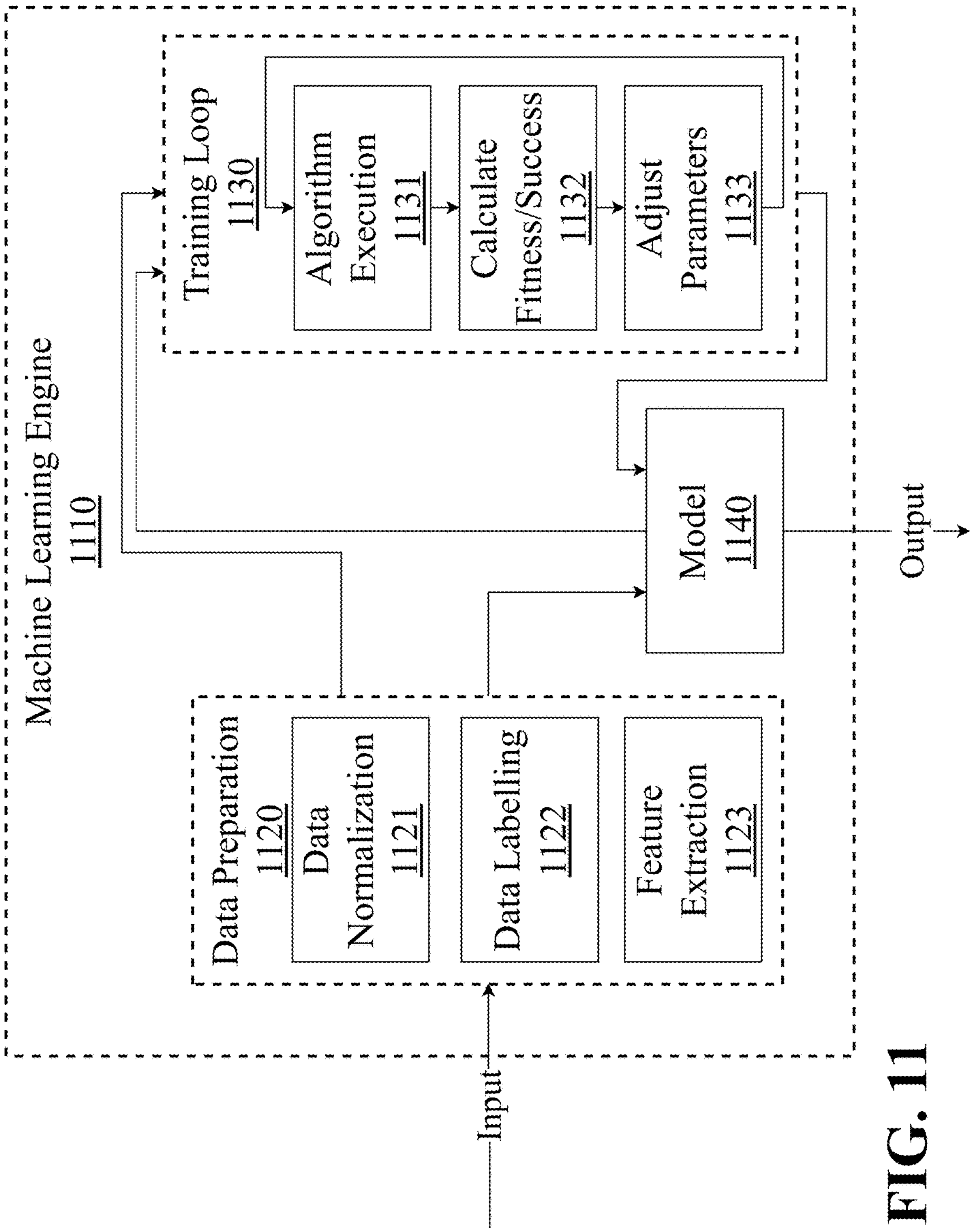
FIG. 11 is a system diagram illustrating an exemplary architecture of a machine learning engine.

FIG. 11 is a system diagram illustrating an exemplary architecture of a machine learning engine. A machine learning engine 1110 may be a software component, standalone software library, system on a chip, Application-Specific Integrated Circuit ("ASIC"), or some other form of digital computing device or system capable of interacting with and receiving data from other digital or software systems. It may be connected over a network, or connected within a system or computer, and may be utilized by software processes or communicate with them as a separate application or process instance. The basic components within a machine learning engine, broadly, are a data preparation 1120 loop or algorithm, which may contain some combination of steps, commonly including data normalization 1121, data labelling 1122, and feature extraction 1123, depending on the exact implementation or configuration of a machine learning engine 1110. A key feature of a machine learning engine 1110, is the existence of some form of a training loop 1130 in their software or chip design, a series of steps taken to take input data and learn how to process it and produce better output, at least in theory. A machine learning engine 1110 may be configured or implemented poorly merely as a matter of execution, and may have trouble learning efficiently or at all, or have difficulty learning usefully from certain knowledge areas or domains, but all machine learning systems contain a training loop of some kind, and they frequently contain the subcomponents or steps of having algorithm execution perform over the set of input data 1131, calculating the fitness or success states or success rate of the algorithm with a current model 1140, and adjusting the parameters of the model to attempt to output better or more useful data for a given input data.

A model 1140 is a software or mathematical representation of data that impacts how an algorithm operates. An algorithm may be any set of concrete steps taken to attempt to process data or arrive at some solution to a problem, such as a basic search algorithm which tries to find a specified value in apparently unsorted numeric data. A basic attempt at such a search algorithm might be to simply jump around randomly in the dataset and look for the value being searched for. If machine learning were applied to such an algorithm, there might be a model of parameters for the algorithm to operate with, such as how far from the current index being examined in the input dataset, to be capable of jumping. For instance, in a set of 1,000 numbers in no readily apparent ordering or sorting scheme, the algorithm to randomly pick numbers until it finds the desired number may have a parameter that specifies that if you are currently at index x in the dataset being searched, you may only jump to a value between x−50 and x+50. This algorithm may then be executed 1131 over a training dataset, and have its fitness calculated 1132, in this example, as the number of computing cycles required to find the number in question. The lower the number, the higher the fitness score.

Using one of many possible parameter adjustment 1133 techniques, including linear regression, genetic variation or evolutionary programming, simulated annealing or other metaheuristic methods, gradient descent, or other mathematical methods for changing parameters in a function to try and approach desired values for specified inputs. Machine learning training method, that is, the way they adjust parameters 1133, may be deterministic or stochastic, as in evolutionary or genetic programming, or metaheuristics in general. Examples of genetic programming include the concept of genetic variation, whereby several different models of an algorithm are run over the same input data, compared for fitness, and a selection function determines which models to use for "breeding" the next "generation" of the model population, at which point a crossover function is used to recombine the "genes" (the word used in genetic programming to refer to function or model parameters) into different arrangements for each new member of the next generation, lastly applying a mutation function to alter (either randomly or statistically) some selection of genes from some selection of the newly bred models, before the process is repeated with the hope of finding some combinations of parameters or "genes" that are better than others and produce successively better generations of models.

Several machine learning methodologies may be combined, as with NeuroEvolution of Augmenting Topologies ("NEAT"), whereby a genetic algorithm is used to breed and recombined various arrangements of neurons and hidden layers and the parameters of neurons, in a neural network, reducing the use of human judgement in the design or topology of a neural network (which otherwise often requires a fair amount of trial and error and human judgement). These situations may be thought of either as multiple different training loops 1130 occurring with multiple models 1140, or may be thought of as multiple machine learning engines 1110 entirely, operating together.

Figure 12:
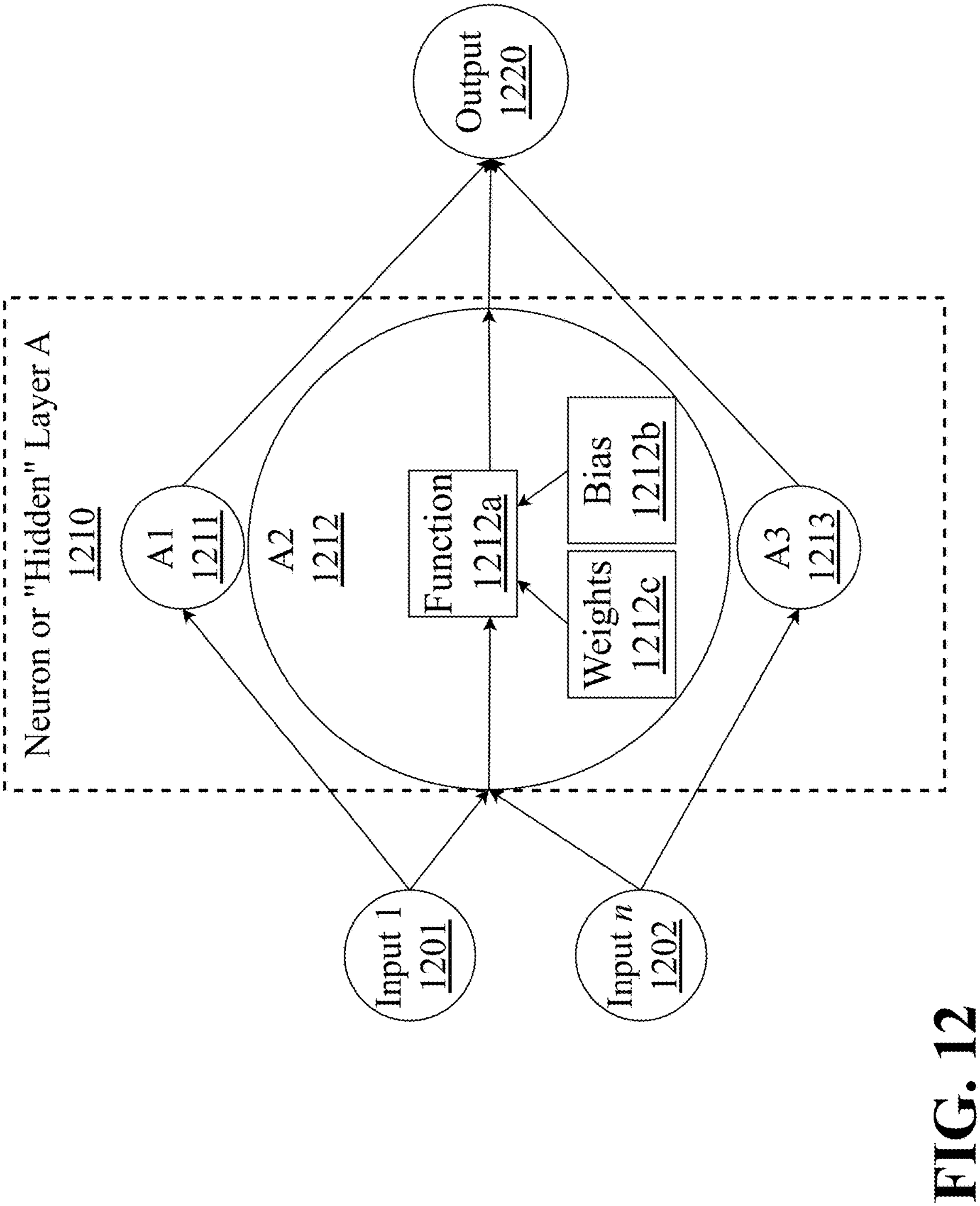
FIG. 12 is a diagram illustrating an exemplary architecture of a neural network.

FIG. 12 is a diagram illustrating an exemplary architecture of a neural network. A neural network is a software system that may be used to attempt to learn or improve an algorithm at a task or set of tasks, using mathematical models and approximations of biological neurons with artificial neurons. The kinds of tasks that may be used in combination with a neural network are potentially unlimited so long as the problem is deterministic, but common applications include classification problems, labeling problems, compression or algorithm parameter tuning problems, image or audio recognition, and natural language processing. Neural networks may be used as part of a machine learning engine, as the method by which training is done and a model is generated. A neural network contains at least one input, here labeled as input 1 1201, but may have multiple inputs, labeled input n 1202, that feed into a neuron layer or hidden layer 1210 which contains at least one artificial neuron, here shown with A1 1211, A2 1212, and A3 1213. Inside of each neuron are three components, an activation function 1212*a*, a bias 1212*b* value, and a weight for each input that feeds into the neuron 1212*c*. An activation function 1212*a* is the function that determines the output of the neuron, and frequently follows a sigmoidal distribution or pattern, but may be any mathematical function, including piecewise functions, identity, binary step, and many others. The activation function 1212*a* is influenced not only by the inputs into a neuron 1201, 1202, but the weight assigned to each input 1212*c*, which multiplies an input value by itself, and a bias 1212*b*, which is a flat value added to the input of the activation function 1212*a*. For instance, with a single input value of 17, a weight of 0.3, and a bias of 0.5, a neuron would run its activation function with an input of 5.6 (17*0.3+0.5). The actual output of the activation function 1212*a*, for each neuron, then may proceed to be output 1220 in some format, usually numeric, before being interpreted by the system utilizing the neural network. There may be multiple output values, representing confidence values in different predictions or classifications, or other multi-valued results.

Various forms and variations of neural networks exist which may be more or less applicable to certain knowledge domains or certain problem sets, including image recognition, data compression, or weather prediction. Some examples of different types of neural networks include recurrent neural networks, convolutional neural networks, deep learning networks, and feed forward neural networks, the last of which is regarded by many as the "standard" or most basic usable form of an artificial neural network.

Figure 13:
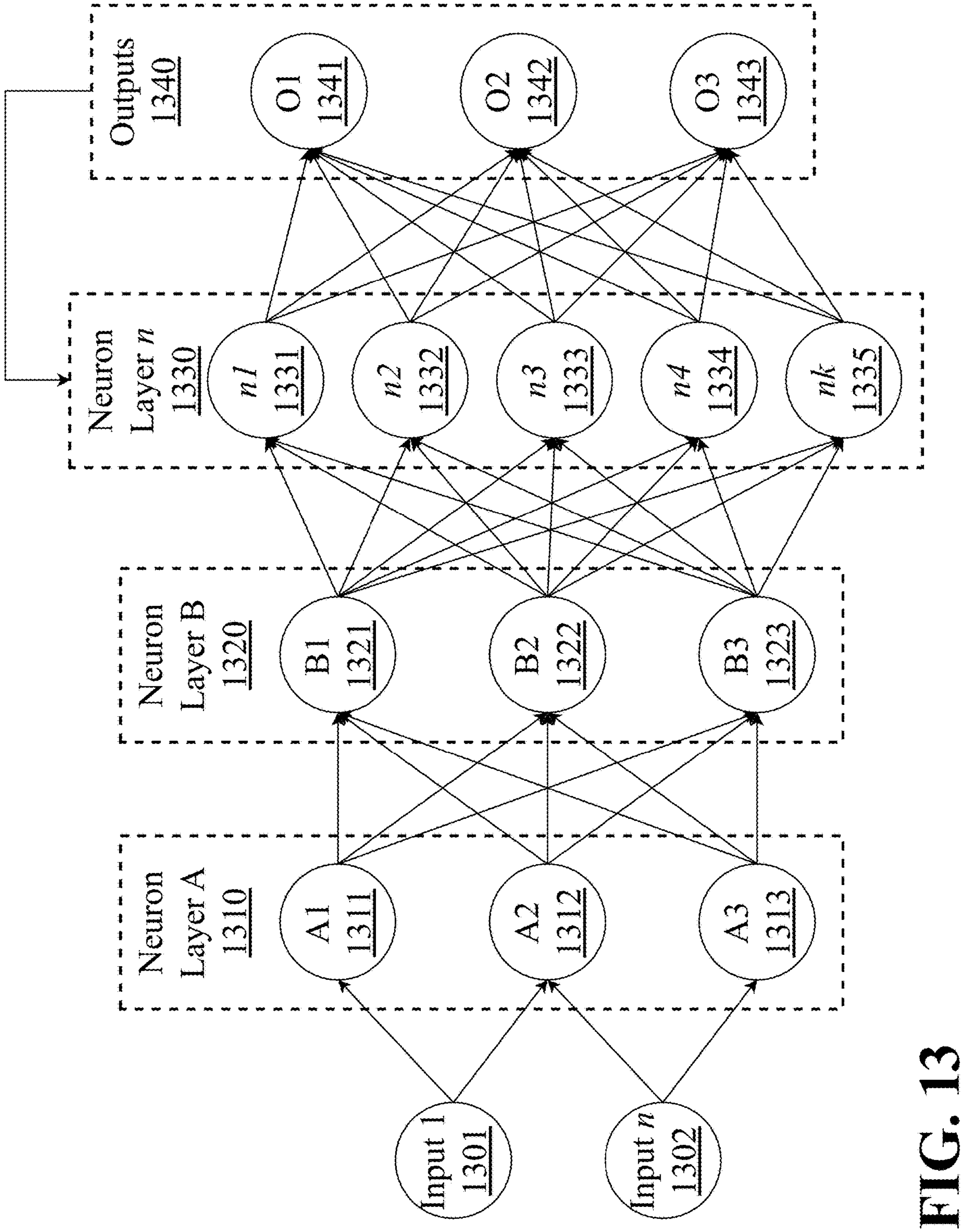
FIG. 13 is a diagram illustrating an exemplary architecture of a deep learning recurrent neural network.

FIG. 13 is a diagram illustrating an exemplary architecture of a deep learning recurrent neural network. An example of a neural network of two different forms, both recurrent and deep, it possesses at least one input 1301 but can potentially (or even usually) have multiple inputs n 1302, and multiple neuron or "hidden" layers, represented as neuron layer A 1310, B 1320, and n 1330, each containing their own neurons A1 1311, A2 1312, A3 1313 in neuron layer A 1310; neurons B1 1321, B2 1322, and B3 1323 in neuron layer B 1320; and neurons n1 1331, n2 1332, n3 1333, n4 1334, and n5 1335, in neuron layer n 1330, mapping to multiple outputs 1340 O1 1341, O2 1342, and O3 1343.

Like all neural networks, there is at least one layer of neurons containing at least one artificial neuron, at least one input, and at least one output, but what makes the network recurrent is that the outputs 1340 map partially or fully in some fashion to another layer or multiple layers 1310, 1320, 1330 of the neural network, allowing the output to be further processed and produce even different outputs both in training and in non-training use. This cycle, allowing output from some nodes to affect subsequent input to the same nodes, is the defining feature of a recurrent neural network ("RNN"), allowing an RNN to exhibit temporal dynamic behavior, that is, allowing the state of later portions of the network to influence previous layers of the network and subsequent outputs, potentially indefinitely as long as the network is operated due to the cyclical nature of the connection(s).

What makes the network "deep" or a deep learning neural network, is the fact that there are multiple layers of artificial neurons 1310, 1320, 1330, which can be engineered differently or uniquely from each other, or all engineered or configured in the same fashion, to fit a variety of tasks and knowledge domains. Deep learning is a frequently used phrase that literally refers to the use of multiple layers of artificial neurons, but more generally refers to a learning system that may be capable of learning a domain or task "deeply" or on multiple levels or in multiple stages. For example, an image recognition system employing deep learning may have its neural networks arranged and utilized in such a way that it is capable of learning to detect edges, and further, detect edges that seem to be faces or hands, separately or distinctly from other kinds of edges. It is not necessary that a neural network have only one label for the variant or type of neural network it is. For instance, almost any type of neural network can be "deep" by having multiple hidden layers, and a convolutional neural network may also have recurrence at some of its layers. Multiple neural networks may also be used in conjunction with, or beside, each other, to achieve highly tailored and sometimes complex results, such as for self-driving vehicles and complex machine vision tasks.

Figure 14:
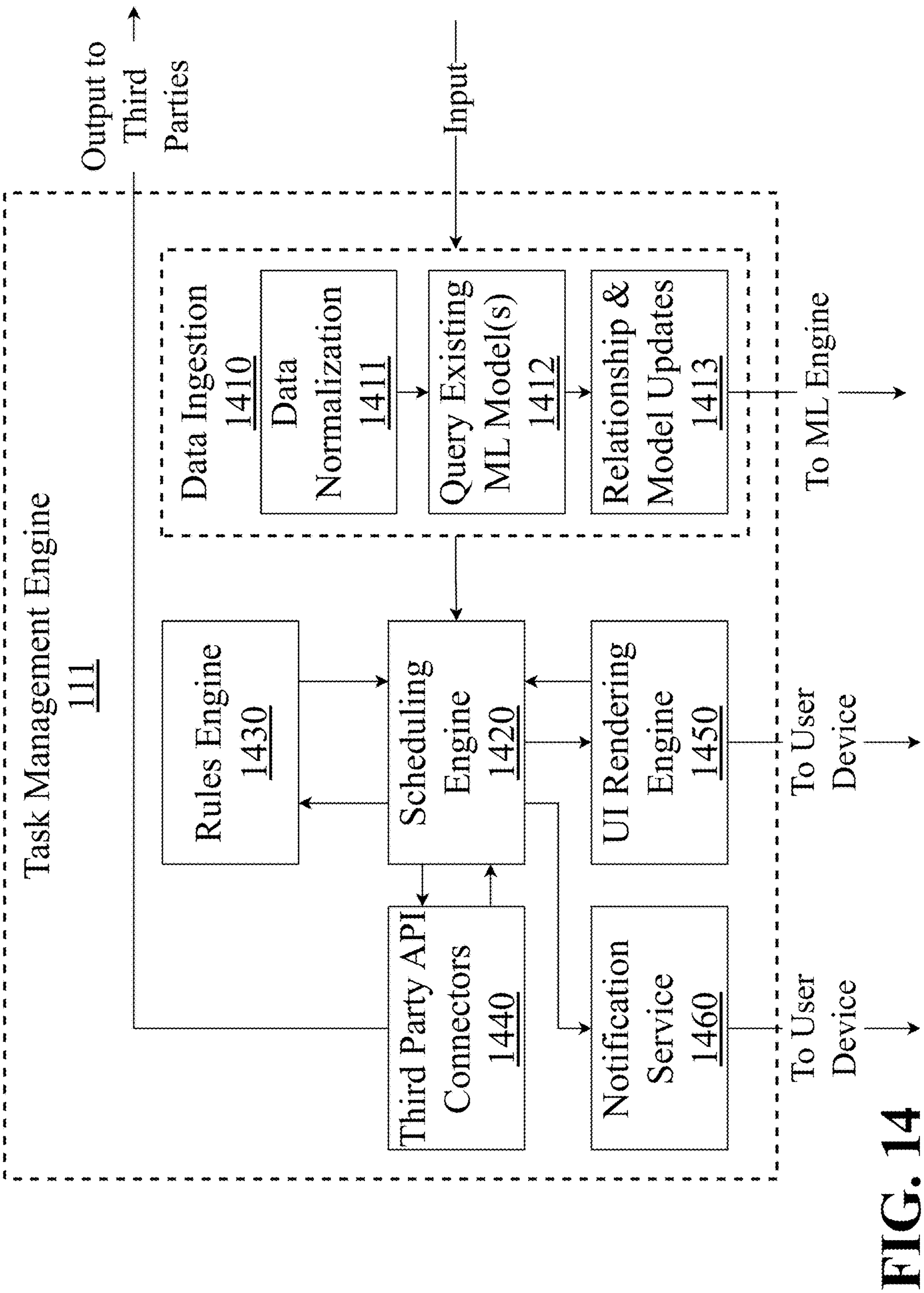
FIG. 14 is a system diagram illustrating the architecture of a task management system, according to an embodiment.

FIG. 14 is a system diagram illustrating the architecture of a task management system, according to an embodiment. A task management engine 111 is a software application, library, or computing system that operates software, for the purposes of managing schedules for users and clients of firms such as financial firms or educational institutions, while communicating with third parties, user devices, and a machine learning engine, to optimize and automate many tasks related to scheduling, task notifications, and task automation or completion. To accomplish this, a task management engine 111 contains components for data ingestion 1410, a scheduling engine 1420, a rules engine 1430, third party API connectors 1440 and interfaces, a UI rendering engine 1450, and a notification service 1460.

Data ingestion 1410 comprises a series of steps when new input for a user's schedule, new tasks, new market or world events, or new machine learning models, are detected or input into the task management engine 111. The data ingestion engine handles data normalization 1411, which may comprise mathematical normalization or a more generic form of normalizing data (such as transforming one data object into another, or in other words, converting between internal formats of data or extracting key data and discarding irrelevant pieces of data); querying of existing machine learning models 1412, which may be held in memory by the task management engine 111 or its parent computing device, or may be queried directly from a machine learning engine; and updating relationships between and within data and models 1413, such as updating user profiles for new information such as an update to their age if they had a birthday recently, or that they have a new child which may present new scheduling challenges or new dates and deadlines to be aware of, and more.

Once data ingestion 1411 has been accomplished, the data is sent to the scheduling engine 1420, which handles the actual construction of and maintenance or altering of a user's schedule. The scheduling engine communicates with a rules engine 1430 that interprets and enforces any external requirements for scheduling, such as a user profile being flagged to not schedule any events for Saturday for religious observances, or for holidays that change for users of different regions. The scheduling engine may also use third party API and data connections 1440, which may be filtered through a data fusion suite, to query any necessary data from connected third parties, such as banks, educational institutions, financial institutions and stock brokerages, markets, third party businesses for employment or work records that might be relevant and shared with the software, government services or publicly accessible documents, or other third party data sources.

Once all necessary data is acquired, a scheduling engine may fit deadlines, tasks, alerts, noteworthy events, or other things needing to be scheduled or brought to a user's attention, into a user's schedule, and render it to them using a UI rendering engine 1450. Such an engine may take the form of a progressive, single page, or multipage web application, viewed through a web browser or web front-end framework such as ELECTRON™, and the scheduling engine 1420 may also use a notification service 1460 to send users notifications via methods such as email, SMS texts, or push notifications, to alert them to upcoming deadlines, tasks, or events.

Figure 15:
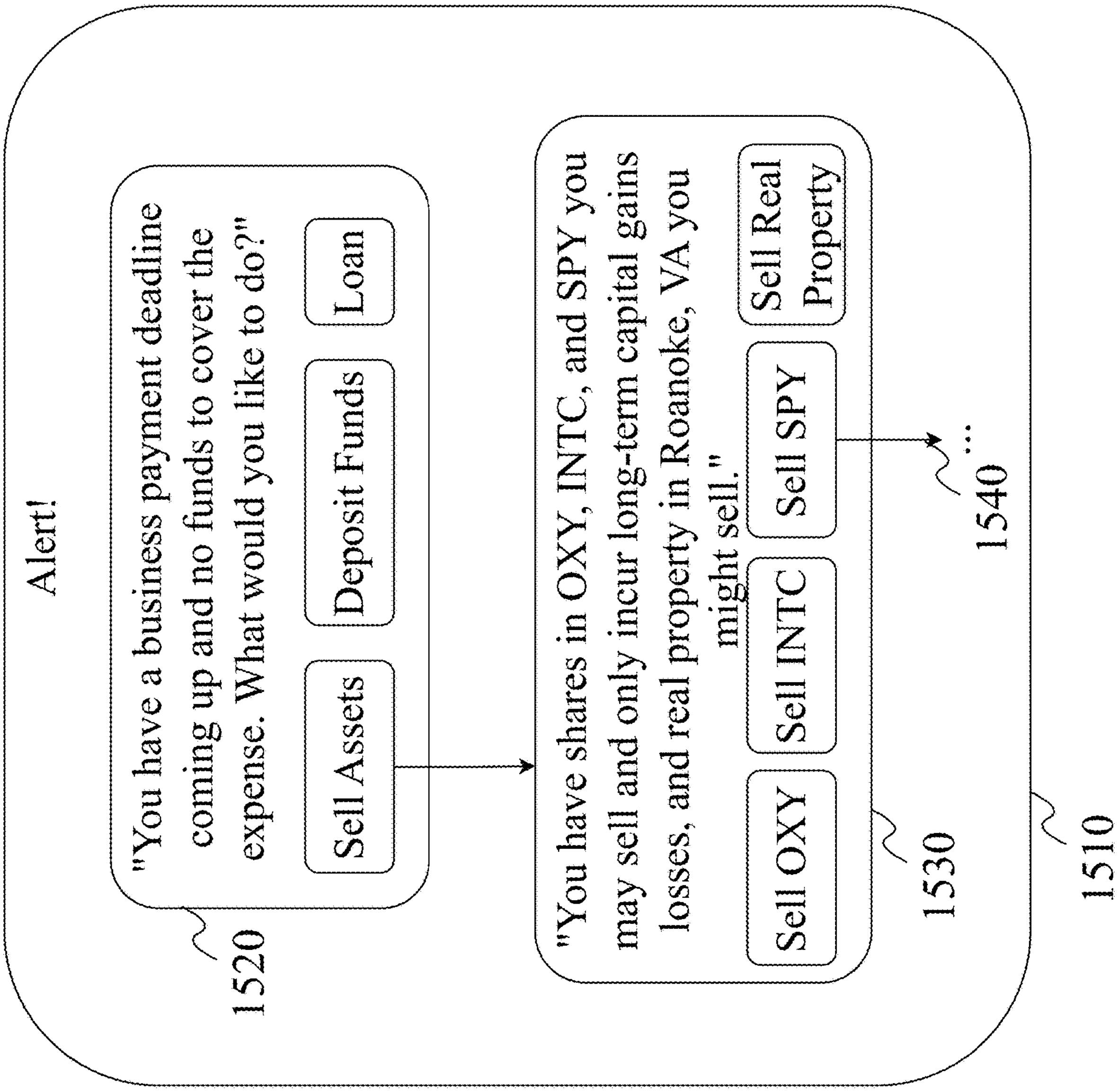
FIG. 15 is a diagram of a user interface for scheduling notification software, according to an embodiment.

FIG. 15 is a diagram of a user interface for scheduling notification software, according to an embodiment. This illustration of an example user interface interaction shows a layered, contextual approach to user interface design, showing an initial "Alert!" 1510 notification to a user, which may be displayed on a phone or other mobile device, a web browser, a native application on a desktop or laptop, within an email, or with some other digital notification and interaction method known in the art. In this example, the notification a user has received displays the text, "You have a business payment deadline coming up and no funds to cover the expense. What would you like to do?" 1520, which then may prompt a user to take one or more actions, or in some cases simply acknowledge the alert. In this case, shown is an example of a "sell asset" button being used to progress to the next contextual or modal dialog 1530 which then alerts a user to the status or result of their decision, in this case, "You have shares in OXY, INTC, and SPY you may sell and only incur long-term capital gains losses, and real property in Roanoke, VA you might sell." 1530, allowing the user to choose further options 1540 including selling specific assets, or even real property, which may cause the system to send a data to a third party API to begin the process of placing their property up for sale using a digital real estate service.

It should be obvious to any with ordinary skill in the art that a variety of possible alerts, notifications, or interactive messages and prompts, may be possible, with a variety of action choices for users, to allow the system to help partially automate actions taken in response to deadlines or events that come up for a user, not merely the one example case shown here.

Figure 16:
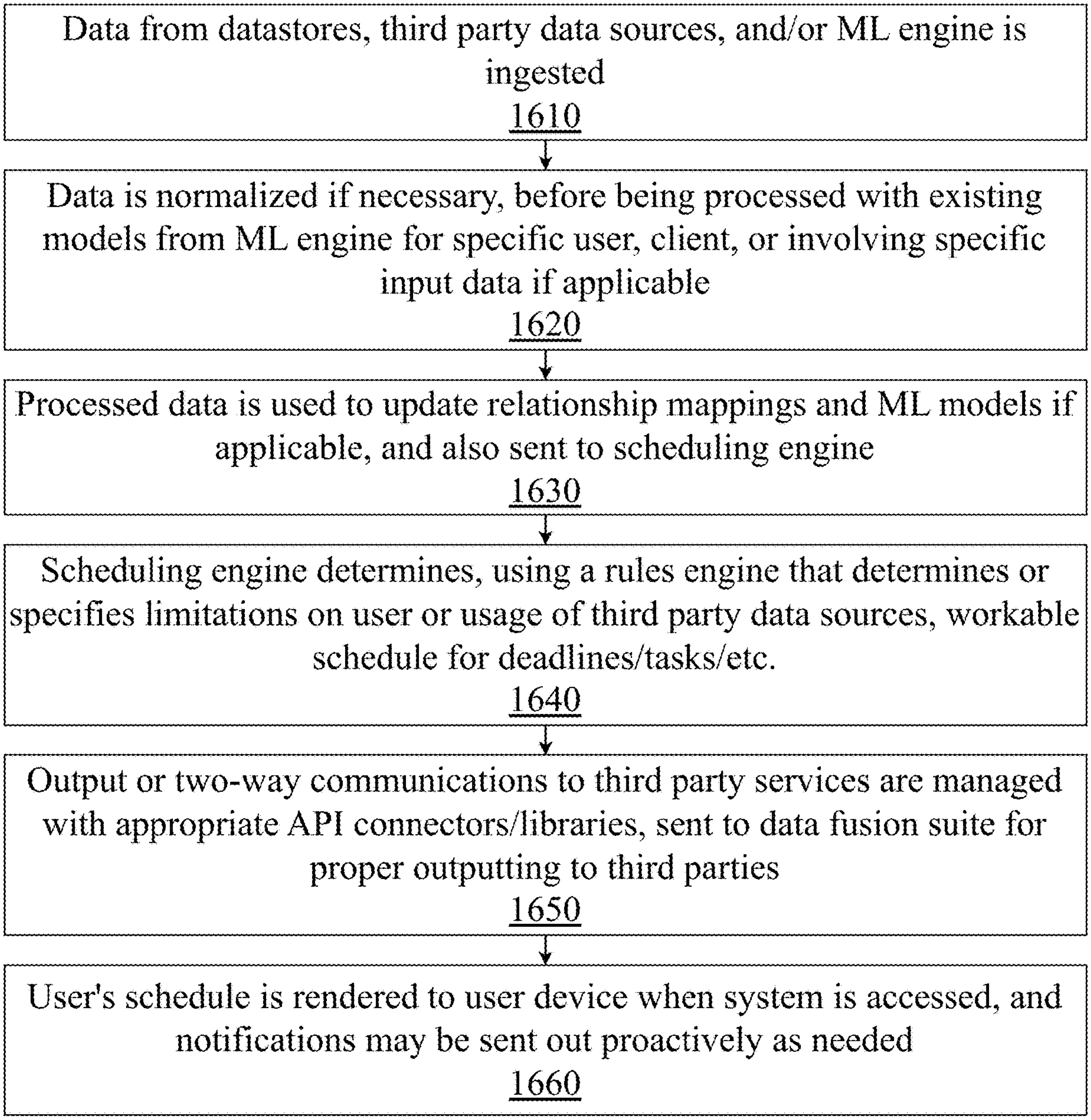
FIG. 16 is a method diagram illustrating the operation of a task management system, according to an embodiment.

FIG. 16 is a method diagram illustrating the operation of a task management system, according to an embodiment. First, data from datastores, third party data sources, or a machine learning engine, or some combination thereof, is ingested 1610 into the task management engine. Data ingestion involves data normalization if necessary, before being processed with existing models from ML engine for specific user, client, or involving specific input data if applicable 1620. Data normalization may take the form of mathematically transforming data, converting data from one format to another, labeling data, or associating data with other data such as user profiles or other input data. Processed data may then be used to update relationship mappings and ML models if applicable, before sending the data and new model or relational mappings, if any, to a scheduling engine 1630. Updates to a machine learning model may be sent to and handled by a machine learning engine, while other updates such as marking a user as having a new relation to some entity (for instance a new bank account, or new stock ownership) may be stored both in a machine learning engine potentially, and also within a task management system, and potentially within a separate datastore such as a user profile datastore. A scheduling engine may determine, with the use of a rules engine that determines or specifies limitations on user or usage of third party data sources, a workable schedule for deadlines, alerts, tasks, and similar, for the user 1640. An example of how a rules engine may limit the scheduling engine is if a user has specified that they will not sell their stocks until they have held them for a year, or if they specified that they won't pay for their child's university class if they don't get a certain minimum grade, which the scheduling engine may determine or check with third parties such as a university system, or by having a user manually enter or upload a transcript in such an example. The task management engine may manage unidirectional or bidirectional communications to third party services, with the use of appropriate API connectors or libraries for each third party, routing the communications through a data fusion suite 1650. User's may view, modify, or otherwise interact with their schedule in a rendered format, with a user device, when the system is accessed, such as through a web browser or native application, and notifications may be sent out proactively as needed 1660 such as SMS or push notifications, of dates or deadlines coming up that a user might need to be made aware of.

Figure 17:
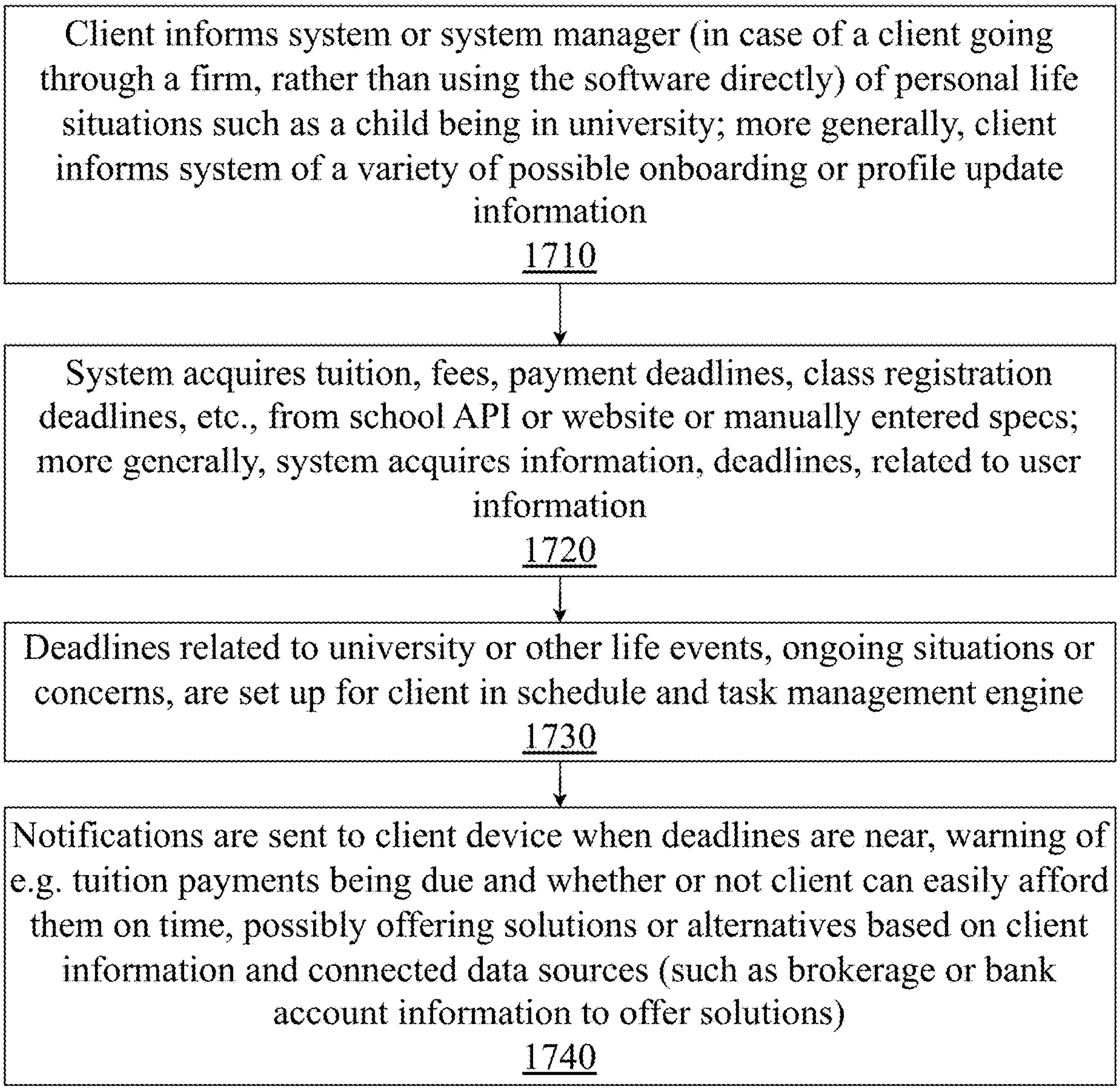
FIG. 17 is a method diagram illustrating the use of scheduling and planning software in more generic use cases aside from merely financial planning and management offices, according to an embodiment.

FIG. 17 is a method diagram illustrating the use of scheduling and planning software in more generic use cases aside from merely financial planning and management offices, according to an embodiment.

A client may inform the system or a system manager (in case of a client going through a firm, rather than using the software directly) of new developments in their personal life, such as a child being accepted to a university; more generally, a client may inform the system of a variety of possible onboarding or profile update information 1710, not necessarily during profile creation or setup but after a profile is already created. New information may be uploaded and configured in the system to refine its predictive capabilities with regards to scheduling and task management for a user In the example case of a user uploading information about their child being enrolled in university, the system may acquire tuition and fee information, payment deadlines, class registration deadlines, and more, from a school API or website, or a user may manually enter this information if it is not available digitally from the institutions. More generally, the system may acquire information related to user information 1720 that is not necessarily related to financial planning specifically. It may remind the user of graduation dates, birthdates, or any other information that the system may be configured to schedule.

Deadlines related to university or other life events, ongoing situations or concerns, are set up for client in schedule and task management engine 1730, in accordance with the information provided by, or about, the user. This data may modify the machine learning model representing the user and their behavior, for increased accuracy and predictive capabilities with regards to the scheduling for that user in the future.

Once the new data has been processed and schedule has been made or modified, notifications may be sent to a user device when deadlines or tasks are near, warning of e.g. tuition payments being due and whether or not client can easily afford them on time, possibly offering solutions or alternatives based on client information and connected data sources (such as brokerage or bank account information to offer solutions) 1740. Other examples of notifications that can be made to users with the system include notifications about possible politically relevant dates, notifications about scheduled weather system testing or rolling blackouts in their area that they may or may not be aware of, or even in more severe or unusual circumstances, warning the user of military or police activity that may be extremely relevant to them.

Figure 19:
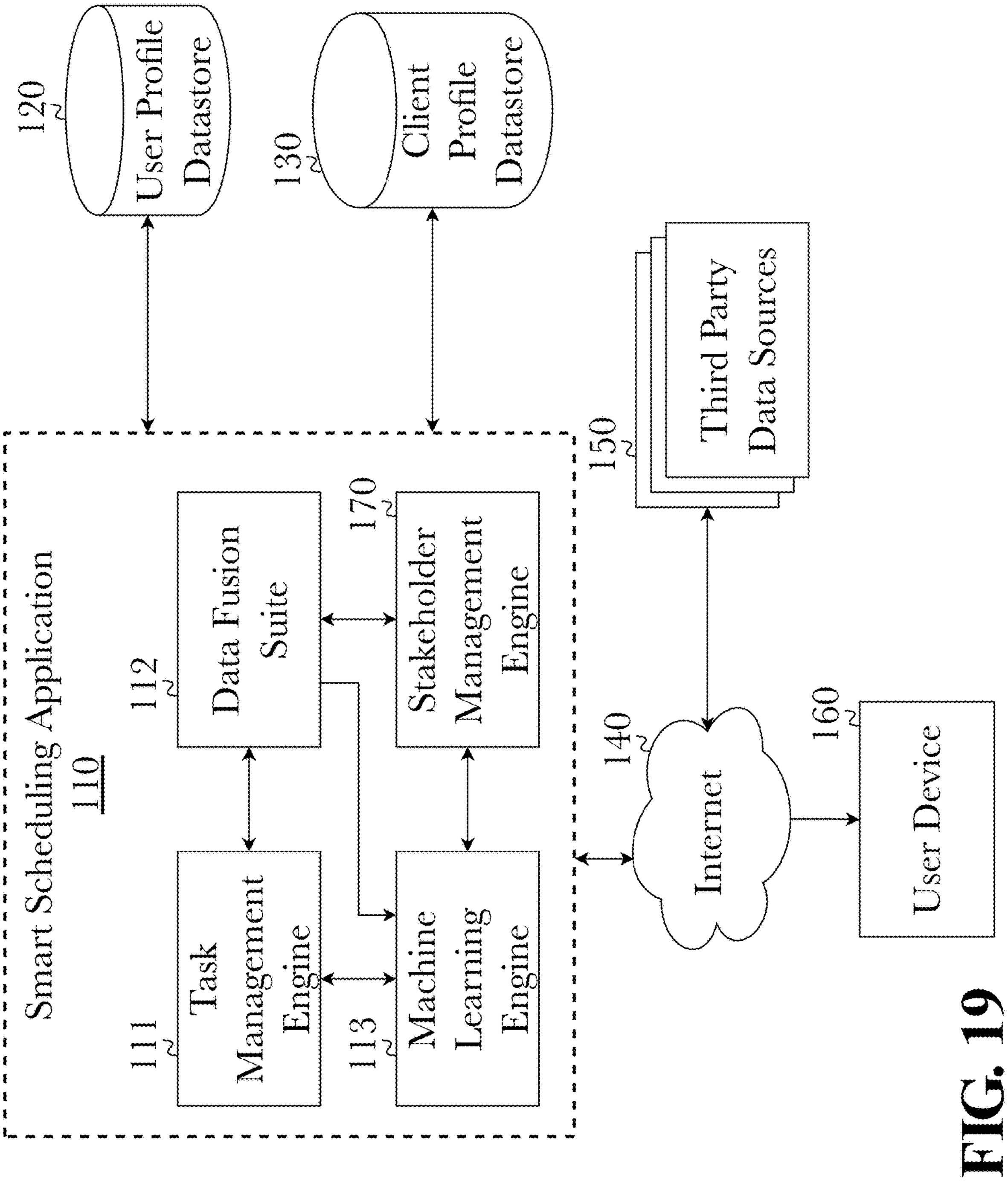
FIG. 19 is a block diagram illustrating an exemplary architecture for task scheduling and financial planning with integrated stakeholder management and multi-party coordination capabilities, according to one aspect.

FIG. 19 is a block diagram illustrating an exemplary system architecture for task scheduling and financial planning with integrated stakeholder management and multi-party coordination capabilities, according to one aspect. A smart scheduling application 110 exists that comprises at least a task management engine 111, data fusion suite 112, machine learning engine 113, and a stakeholder management engine 170, with connections to a user profile datastore 120, client profile datastore 130, and through the internet 140 it also may connect with third party data sources 150 and multiple user devices 160, where the user devices may be any common end-user devices for computing, task tracking, or communications, including fitness trackers, digital assistants, laptops, desktops, mobile phones including smartphones, tablets, or other common computing devices utilized by multiple authorized parties. A smart scheduling application 110 may exist on a server or in a cloud architecture in a serverless or elastic configuration, and may maintain connections to separate or external datastores 120, 130, or may have such datastores as internal parts of the server or cloud configuration, or the application's configuration, depending on the implementation and architectural choices made when implementing this embodiment.

A third party data source 150 may be a financial institution such as a bank, stock brokerage, trading platform, credit union or loaning service, data subscription service or feed, news service or publication, legal service provider, accounting firm, educational institution, government agency, or some other third party or external data provider for which any useful scheduling, financial, legal, educational, world-event, or business-related data may be acquired from. Such a third-party data source 150 may be sent requests for up-to-date data from the scheduling application 110, or may be configured to send data updates or livestreaming data to the smart scheduling application 110, depending on the data source and configuration. Multiple user devices 160 represent devices used by authorized stakeholders including primary users, clients, family members, financial advisors, attorneys, certified public accountants, estate planners, insurance agents, and other designated service providers who require coordinated access to scheduling and project management functionality.

According to this embodiment, the stakeholder management engine 170 serves as a central coordination hub that manages multi-party access control, communication integration, and collaborative project management for financial planning activities involving multiple authorized service providers and stakeholders. The stakeholder management engine 170 implements a comprehensive role-based permission system that allows primary financial advisors or clients to designate specific access levels to a plurality of categories of information, including but not limited to scheduling data, financial records, communication transcripts, task assignments, and project documentation. The engine maintains separate, compartmentalized project workspaces for each client engagement, ensuring that confidential information for different clients cannot be accessed by unauthorized parties while enabling seamless collaboration among authorized stakeholders working on the same client project.

The stakeholder management engine includes real-time communication integration capabilities that can monitor, record, and transcribe authorized multi-party communications including conference calls, video meetings, email exchanges, and collaborative planning sessions. These communication transcription services utilize advanced speech recognition and natural language processing algorithms to convert spoken discussions into searchable, categorized text records that are automatically integrated into appropriate client project files and made accessible to authorized parties based on their designated permission levels. The engine may operate in transparent mode, where all parties are aware that communications are being recorded and transcribed, or in discrete monitoring mode, where client-authorized observation of advisor discussions may occur without disrupting the natural flow of professional communications between service providers.

To ensure regulatory compliance and maintain client trust, the stakeholder management engine 170 incorporates comprehensive audit trail functionality that logs all stakeholder interactions, data access events, permission changes, communication activities, and file modifications with timestamp and user identification information. These audit trails are maintained in tamper-resistant formats that comply with financial industry regulatory requirements including but not limited to the Gramm-Leach-Bliley Act (GLBA), Sarbanes-Oxley Act (SOX), and applicable state and federal privacy regulations. The engine provides clients with complete transparency regarding who has accessed their information, when such access occurred, what actions were taken, and what communications or decisions resulted from stakeholder collaboration, thereby enabling clients to maintain oversight of all professional activities conducted on their behalf.

The stakeholder management engine 170 integrates with the existing machine learning engine 113 to analyze communication patterns, stakeholder interaction effectiveness, and collaborative decision-making processes to optimize future multi-party coordination activities. This integration allows the system to learn from successful stakeholder collaboration patterns and recommend optimal communication channels, meeting scheduling, and task delegation strategies based on historical performance data and stakeholder preferences. The stakeholder management engine 170 also communicates with the task management engine 111 to coordinate assignment of tasks and deadlines across multiple authorized parties, ensuring that collaborative projects maintain appropriate scheduling and accountability measures while respecting each stakeholder's individual scheduling constraints and professional obligations.

By way of example, the stakeholder management engine 170 facilitates coordinated financial planning activities involving legal counsel through integrated multi-party project management. In a typical scenario, a financial advisor managing a high-net-worth client's estate planning activities may grant a designated estate planning attorney specific access permissions to relevant financial data, tax documents, and trust-related scheduling information while maintaining strict confidentiality barriers preventing the attorney from accessing unrelated client financial activities or other clients' information. When the financial advisor, client, and attorney conduct a joint conference call to discuss trust structure modifications, the stakeholder management engine 170 can automatically transcribe the conversation, identify action items and deadlines mentioned during the discussion, and distribute appropriate portions of the transcript and resulting tasks to each party based on their authorization levels. The client maintains oversight visibility into all advisor-attorney communications and can observe the collaborative decision-making process either transparently or through discrete monitoring capabilities, ensuring complete awareness of how legal and financial strategies are being coordinated on their behalf. The system automatically schedules follow-up meetings, coordinates document preparation deadlines between the advisor and attorney, and ensures that all parties receive appropriate notifications regarding time-sensitive legal filing requirements or financial transaction deadlines, while maintaining comprehensive audit trails of all inter-professional communications and decisions for regulatory compliance and client accountability purposes.

The stakeholder management engine 170 implements advanced privacy and data control mechanisms designed to ensure comprehensive protection of sensitive client information during multi-party coordination activities. The engine may utilize end-to-end encryption protocols for all stakeholder communications, including real-time messaging, document sharing, video conferencing, and voice communication, ensuring that data remains encrypted during transmission and is only accessible to parties possessing appropriate decryption keys. The system maintains client-controlled data sharing permissions that may be dynamically modified or completely revoked in real-time, allowing clients to immediately terminate access to their information for any designated stakeholder without requiring system administrator intervention or delays. These granular permission controls operate at the data element level, enabling clients to specify exactly which categories of information each stakeholder can access, including but not limited to financial account data, tax documents, legal correspondence, meeting transcripts, or scheduling information.

To prevent unauthorized information disclosure, the stakeholder management engine 170 maintains strictly compartmentalized project workspaces that utilize logical and physical data separation techniques to prevent cross-contamination of client information, ensuring that stakeholders working on multiple client engagements cannot inadvertently access information from unrelated client projects. The system implements comprehensive compliance frameworks specifically designed to meet regulatory requirements including the General Data Protection Regulation (GDPR), California Privacy Rights Act (CPRA), Gramm-Leach-Bliley Act (GLBA), Health Insurance Portability and Accountability Act (HIPAA) where applicable, and other relevant federal, state, and international privacy regulations. These compliance frameworks include automated data retention policies, consent management systems, breach notification protocols, and regular privacy impact assessments that ensure ongoing adherence to evolving regulatory requirements while maintaining operational efficiency for authorized collaborative activities.

Figure 20:
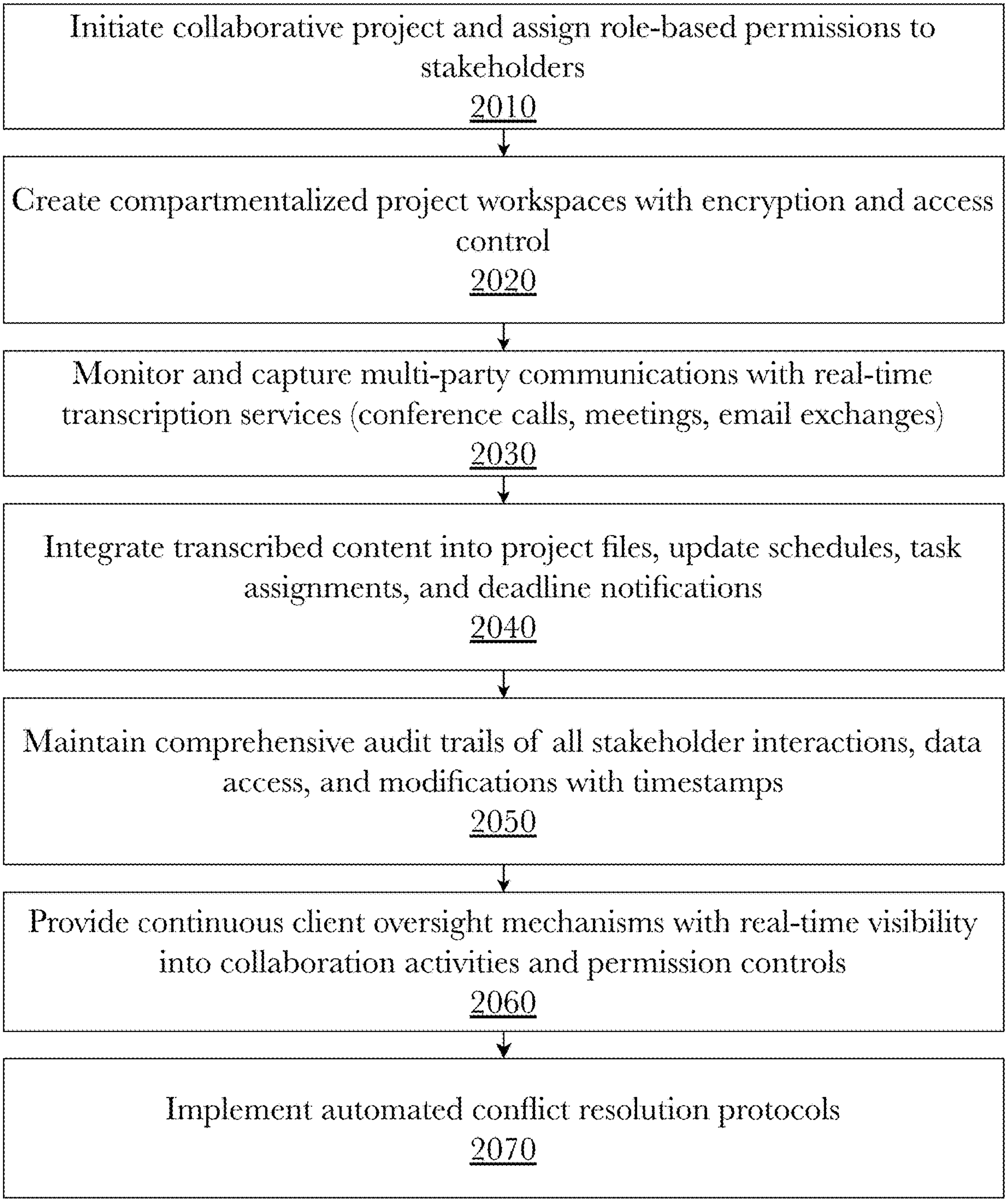
FIG. 20 is a flow diagram illustrating an exemplary method for multi-party stakeholder coordination and collaborative financial planning with integrated client oversight and transparency mechanisms, according to one aspect.

FIG. 20 is a flow diagram illustrating an exemplary method for multi-party stakeholder coordination and collaborative financial planning with integrated client oversight and transparency mechanisms, according to one aspect. The method beings when a financial advisor or primary user initiates a new collaborative project by designating authorized stakeholders and assigning role-based permissions for each party involved in the client engagement 2010. This initial setup process involves identifying all relevant service providers such as attorneys, certified public accountants (CPAs), estate planners, insurance agents, investment advisors, or family members who require access to specific categories of client information or scheduling coordination. Each stakeholder is assigned granular permission levels that determine their access to financial data, communication transcripts, scheduling information, document libraries, and task management capabilities, with all permission assignments being subject to client approval and oversight.

Once stakeholder roles are established, the system creates compartmentalized project workspaces that ensure strict data separation between different client engagements while enabling seamless collaboration among authorized parties working on the same project 2020. These workspaces are configured with encryption protocols and access controls that prevent unauthorized cross-contamination of client information, maintaining separate communication channels, document repositories, and scheduling calendars for each client project while allowing designated stakeholders to collaborate effectively within their authorized scope of access. The system then monitors and captures multi-party communications including conference calls, video meetings, email exchanges, and collaborative planning sessions, utilizing real-time transcription services to convert spoken discussions into searchable, categorized text records 2030. Advanced speech recognition and natural language processing algorithms identify key discussion points, action items, deadlines, and decision outcomes from collaborative communications, automatically tagging and categorizing transcribed content based on subject matter, urgency, and relevance to specific project objectives. The transcription process operates in either transparent mode, where all parties are informed of recording and transcription activities, or discrete monitoring mode, where client-authorized observation occurs without disrupting professional communications.

Following communication capture and processing, the system integrates transcribed content and identified action items into the appropriate client project files, automatically updating schedules, task assignments, and deadline notifications for all authorized stakeholders 2040. The machine learning engine analyzes communication patterns and collaboration effectiveness to optimize future stakeholder coordination, identifying successful interaction models and recommending improved communication strategies, meeting scheduling, and task delegation approaches based on historical performance data and stakeholder preferences.

Throughout all collaborative activities, the system maintains comprehensive audit trails that log every stakeholder interaction, data access event, permission change, communication activity, and file modification with detailed timestamp and user identification information 2050. These audit records are maintained in tamper-resistant formats that comply with financial industry regulatory requirements, providing clients with complete transparency regarding all professional activities conducted on their behalf while ensuring regulatory compliance with applicable privacy and financial oversight regulations.

The method includes continuous client oversight mechanisms that provide real-time visibility into stakeholder collaboration activities, allowing clients to observe advisor-to-advisor communications, review transcribed planning discussions, monitor task completion progress, and maintain awareness of all strategic decisions being made regarding their financial management 2060. Clients maintain ultimate control over stakeholder access permissions and may modify or revoke access rights at any time, with all changes being immediately implemented across the system and documented in the audit trail for accountability and compliance purposes.

When conflicts arise between stakeholder scheduling preferences or when multiple parties attempt to modify shared project elements simultaneously, the system implements automated conflict resolution protocols that prioritize changes based on predefined hierarchy rules, stakeholder authority levels, and client preferences 2070. Conflicting modifications are flagged for manual review when automated resolution is not possible, with all parties being notified of conflicts and provided with collaborative resolution options that maintain project continuity while respecting individual stakeholder constraints and professional obligations.

Exemplary Computing Environment

Figure 18:
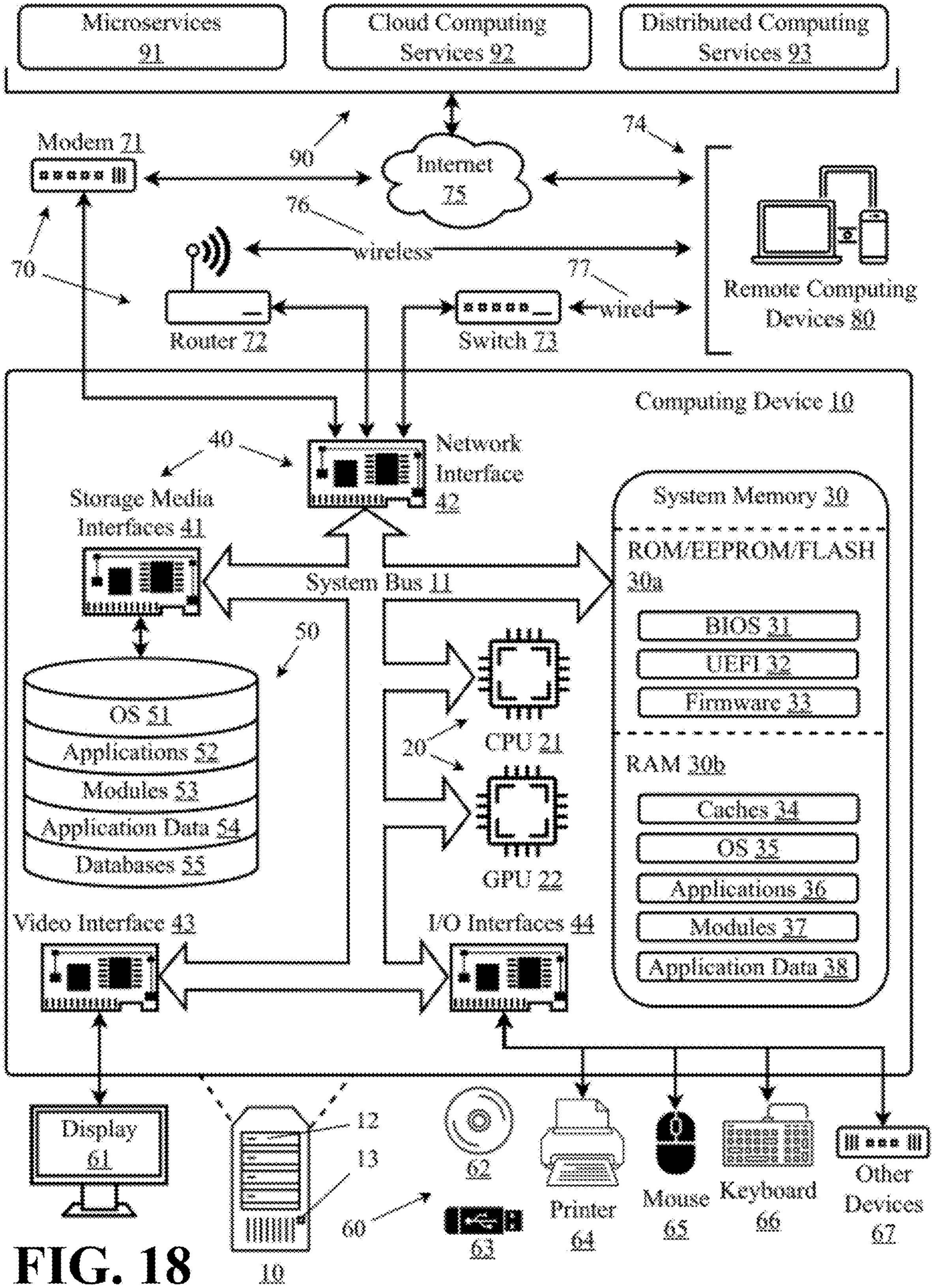
FIG. 18 illustrates an exemplary computing environment on which an embodiment described herein may be implemented, in full or in part.

FIG. 18 illustrates an exemplary computing environment on which an embodiment described herein may be implemented, in full or in part. This exemplary computing environment describes computer-related components and processes supporting enabling disclosure of computer-implemented embodiments. Inclusion in this exemplary computing environment of well-known processes and computer components, if any, is not a suggestion or admission that any embodiment is no more than an aggregation of such processes or components. Rather, implementation of an embodiment using processes and components described in this exemplary computing environment will involve programming or configuration of such processes and components resulting in a machine specially programmed or configured for such implementation. The exemplary computing environment described herein is only one example of such an environment and other configurations of the components and processes are possible, including other relationships between and among components, and/or absence of some processes or components described. Further, the exemplary computing environment described herein is not intended to suggest any limitation as to the scope of use or functionality of any embodiment implemented, in whole or in part, on components or processes described herein.

The exemplary computing environment described herein comprises a computing device (further comprising a system bus 11, one or more processors 20, a system memory 30, one or more interfaces 40, one or more non-volatile data storage devices 50), external peripherals and accessories 60, external communication devices 70, remote computing devices 80, and cloud-based services 90.

System bus 11 couples the various system components, coordinating operation of and data transmission between, those various system components. System bus 11 represents one or more of any type or combination of types of wired or wireless bus structures including, but not limited to, memory busses or memory controllers, point-to-point connections, switching fabrics, peripheral busses, accelerated graphics ports, and local busses using any of a variety of bus architectures. By way of example, such architectures include, but are not limited to, Industry Standard Architecture (ISA) busses, Micro Channel Architecture (MCA) busses, Enhanced ISA (EISA) busses, Video Electronics Standards Association (VESA) local busses, a Peripheral Component Interconnects (PCI) busses also known as a Mezzanine busses, or any selection of, or combination of, such busses. Depending on the specific physical implementation, one or more of the processors 20, system memory 30 and other components of the computing device 10 can be physically co-located or integrated into a single physical component, such as on a single chip. In such a case, some or all of system bus 11 can be electrical pathways within a single chip structure.

Computing device may further comprise externally-accessible data input and storage devices 12 such as compact disc read-only memory (CD-ROM) drives, digital versatile discs (DVD), or other optical disc storage for reading and/or writing optical discs 62; magnetic cassettes, magnetic tape, magnetic disk storage, or other magnetic storage devices; or any other medium which can be used to store the desired content and which can be accessed by the computing device 10. Computing device may further comprise externally-accessible data ports or connections 12 such as serial ports, parallel ports, universal serial bus (USB) ports, and infrared ports and/or transmitter/receivers. Computing device may further comprise hardware for wireless communication with external devices such as IEEE 1394 ("Firewire") interfaces, IEEE 802.11 wireless interfaces, BLUETOOTH® wireless interfaces, and so forth. Such ports and interfaces may be used to connect any number of external peripherals and accessories 60 such as visual displays, monitors, and touch-sensitive screens 61, USB solid state memory data storage drives (commonly known as "flash drives" or "thumb drives") 63, printers 64, pointers and manipulators such as mice 65, keyboards 66, and other devices such as joysticks and gaming pads, touchpads, additional displays and monitors, and external hard drives (whether solid state or disc-based), microphones, speakers, cameras, and optical scanners.

Processors 20 are logic circuitry capable of receiving programming instructions and processing (or executing) those instructions to perform computer operations such as retrieving data, storing data, and performing mathematical calculations. Processors 20 are not limited by the materials from which they are formed or the processing mechanisms employed therein, but are typically comprised of semiconductor materials into which many transistors are formed together into logic gates on a chip (i.e., an integrated circuit or IC). However, the term processor includes any device capable of receiving and processing instructions including, but not limited to, processors operating on the basis of quantum computing, optical computing, mechanical computing (e.g., using nanotechnology entities to transfer data), and so forth. Depending on configuration, computing device 10 may comprise more than one processor. For example, computing device 10 may comprise one or more central processing units (CPUs) 21, each of which itself has multiple processors or multiple processing cores, each capable or independently or semi-independently processing programming instructions. Further, computing device 10 may comprise one or more specialized processors such as a graphics processing unit (GPU) 22 configured to accelerate processing of computer graphics and images via a large array of specialized processing cores arranged in parallel.

System memory 30 is processor-accessible data storage in the form of volatile and/or nonvolatile memory. System memory 30 may be either or both of two types: non-volatile memory 30*a* such as read only memory (ROM), electronically-erasable programmable memory (EEPROM), or rewritable solid state memory (commonly known as "flash memory"). Non-volatile memory 30*a* is not erased when power to the memory is removed. Non-volatile memory 30*a* is typically used for long-term storage a basic input/output system (BIOS) 31, containing the basic instructions, typically loaded during computer startup, for transfer of information between components within computing device, unified extensible firmware interface (UEFI), which is a modern replacement for BIOS that supports larger hard drives, faster boot times, more security features, and provides native support for graphics and mouse cursors. Non-volatile memory 30*a* may also be used to store firmware comprising a complete operating system 35 and applications 36 for operating computer-controlled devices. The firmware approach is often used for purpose-specific computer-controlled devices such as appliances and Internet-of-Things (IoT) devices where processing power and data storage space is limited. Volatile memory 30*b* is erased when power to the memory is removed and is typically used for short-term storage of data for processing. Volatile memory 30*b* such as random access memory (RAM) is normally the primary operating memory into which the operating system 35, applications 36, program modules 37, and application data 38 are loaded for execution by processors 20. Volatile memory 30*b* is generally faster than non-volatile memory 30*a* due to its electrical characteristics and is directly accessible to processors 20 for processing of instructions and data storage and retrieval. Volatile memory 30*b* may comprise one or more smaller cache memories which operate at a higher clock speed and are typically placed on the same IC as the processors to improve performance.

Interfaces 40 may include, but are not limited to, storage media interfaces 41, network interfaces 42, display interfaces 43, and input/output interfaces 44. Storage media interface 41 provides the necessary hardware interface for loading data from non-volatile data storage devices 50 into system memory 30 and storage data from system memory 30 to non-volatile data storage device 50. Network interface 42 provides the necessary hardware interface for computing device to communicate with remote computing devices 80 and cloud-based services 90 via one or more external communication devices 70. Display interface 43 allows for connection of displays 61, monitors, touchscreens, and other visual input/output devices. Display interface 43 may include a graphics card for processing graphics-intensive calculations and for handling demanding display requirements. Typically, a graphics card includes a graphics processing unit (GPU) and video RAM (VRAM) to accelerate display of graphics. One or more input/output (I/O) interfaces 44 provide the necessary support for communications between computing device and any external peripherals and accessories 60. For wireless communications, the necessary radio-frequency hardware and firmware may be connected to I/O interface 44 or may be integrated into I/O interface 44.

Non-volatile data storage devices 50 are typically used for long-term storage provide long-term storage of data. Data on non-volatile data storage devices 50 is not erased when power to the non-volatile data storage devices 50 is removed. Non-volatile data storage devices 50 may be implemented using technology for non-volatile storage of content such as CD-ROM drives, digital versatile discs (DVD), or other optical disc storage; magnetic cassettes, magnetic tape, magnetic disc storage, or other magnetic storage devices; solid state memory technologies such as EEPROM or flash memory; or other memory technology or any other medium which can be used to store data without requiring power to retain the data after it is written. Non-volatile data storage devices 50 may be non-removable from computing 10 as in the case of internal hard drives, removable from computing device 10 as in the case of external USB hard drives, or a combination thereof, but computing device will comprise one or more internal, non-removable hard drives using either magnetic disc or solid state memory technology. Non-volatile data storage devices 50 may store any type of data including, but not limited to, an operating system 51 for providing low-level and mid-level functionality of computing device 10, applications for providing high-level functionality of computing device 10, program modules 53 such as containerized programs or applications, or other modular content or modular programming, application data 54, and databases 55 such as relational databases, non-relational databases, and graph databases.

Applications (also known as computer software or software applications) are sets of programming instructions designed to perform specific tasks or provide specific functionality on a computer or other computing devices. Applications are typically written in high-level programming languages such as C++, Java, and Python, which are then either interpreted at runtime or compiled into low-level, binary, processor-executable instructions operable on processors 20. Applications may be containerized so that they can be run on any computer hardware running any known operating system. Containerization of computer software is a method of packaging and deploying applications along with their operating system dependencies into self-contained, isolated units known as containers. Containers provide a lightweight and consistent runtime environment that allows applications to run reliably across different computing environments, such as development, testing, and production systems.

The memories and non-volatile data storage devices described herein do not include communication media. Communication media are means of transmission of information such as modulated electromagnetic waves or modulated data signals configured to transmit, not store, information. By way of example, and not limitation, communication media includes wired communications such as sound signals transmitted to a speaker via a speaker wire, and wireless communications such as acoustic waves, radio frequency (RF) transmissions, infrared emissions, and other wireless media.

External communication devices 70 are devices that facilitate communications between computing device and either remote computing devices 80, or cloud-based services 90, or both. External communication devices 70 include, but are not limited to, data modems 71 which facilitate data transmission between computing device and the Internet 75 via a common carrier such as a telephone company or internet service provider (ISP), routers 72 which facilitate data transmission between computing device and other devices, and switches 73 which provide direct data communications between devices on a network. Here, modem 71 is shown connecting computing device 10 to both remote computing devices 80 and cloud-based services 90 via the Internet 75. While modem 71, router 72, and switch 73 are shown here as being connected to network interface 42, many different network configurations using external communication devices 70 are possible. Using external communication devices 70, networks may be configured as local area networks (LANs) for a single location, building, or campus, wide area networks (WANs) comprising data networks that extend over a larger geographical area, and virtual private networks (VPNs) which can be of any size but connect computers via encrypted communications over public networks such as the Internet 75. As just one exemplary network configuration, network interface 42 may be connected to switch 73 which is connected to router 72 which is connected to modem 71 which provides access for computing device 10 to the Internet 75. Further, any combination of wired 77 or wireless 76 communications between and among computing device 10, external communication devices 70, remote computing devices 80, and cloud-based services 90 may be used. Remote computing devices 80, for example, may communicate with computing device through a variety of communication channels 74 such as through switch 73 via a wired 77 connection, through router 72 via a wireless connection 76, or through modem 71 via the Internet 75. Furthermore, while not shown here, other hardware that is specifically designed for servers may be employed. For example, secure socket layer (SSL) acceleration cards can be used to offload SSL encryption computations, and transmission control protocol/internet protocol (TCP/IP) offload hardware and/or packet classifiers on network interfaces 42 may be installed and used at server devices.

In a networked environment, certain components of computing device 10 may be fully or partially implemented on remote computing devices 80 or cloud-based services. Data stored in non-volatile data storage device 50 may be received from, shared with, duplicated on, or offloaded to a non-volatile data storage device on one or more remote computing devices 80 or in a cloud computing service 92. Processing by processors 20 may be received from, shared with, duplicated on, or offloaded to processors of one or more remote computing devices 80 or in a distributed computing service 93. By way of example, data may reside on a cloud computing service, but may be usable or otherwise accessible for use by computing device 10. Also, certain processing subtasks may be sent to a microservice 91 for processing with the result being transmitted to computing device 10 for incorporation into a larger processing task. Also, while components and processes of the exemplary computing environment are illustrated herein as discrete units (e.g., OS 51 being stored on non-volatile data storage device 51 and loaded into system memory 30 for use) such processes and components may reside or be processed at various times in different components of computing device 10, remote computing devices 80, and/or cloud-based services 90.

Remote computing devices 80 are any computing devices not part of computing device 10. Remote computing devices 80 include, but are not limited to, personal computers, server computers, thin clients, thick clients, personal digital assistants (PDAs), mobile telephones, watches, tablet computers, laptop computers, multiprocessor systems, microprocessor based systems, set-top boxes, programmable consumer electronics, video game machines, game consoles, portable or handheld gaming units, network terminals, desktop personal computers (PCs), minicomputers, main frame computers, network nodes, and distributed or multi-processing computing environments. While remote computing devices 80 are shown for clarity as being separate from cloud-based services 90, cloud-based services 90 are implemented on collections of networked remote computing devices 80.

Cloud-based services 90 are Internet-accessible services implemented on collections of networked remote computing devices 80. Cloud-based services are typically accessed via application programming interfaces (APIs) which are software interfaces which provide access to computing services within the cloud-based service via API calls, which are pre-defined protocols for requesting a computing service and receiving the results of that computing service. While cloud-based services may comprise any type of computer processing or storage, three common categories of cloud-based services 90 are microservices 91, cloud computing services 92, and distributed computing services.

Microservices 91 are collections of small, loosely coupled, and independently deployable computing services. Each microservice represents a specific business functionality and runs as a separate process or container. Microservices promote the decomposition of complex applications into smaller, manageable services that can be developed, deployed, and scaled independently. These services communicate with each other through well-defined APIs (Application Programming Interfaces), typically using lightweight protocols like HTTP or message queues. Microservices 91 can be combined to perform more complex processing tasks.

Cloud computing services 92 are delivery of computing resources and services over the Internet 75 from a remote location. Cloud computing services 92 provide additional computer hardware and storage on as-needed or subscription basis. For example, cloud computing services 92 can provide large amounts of scalable data storage, access to sophisticated software and powerful server-based processing, or entire computing infrastructures and platforms. For example, cloud computing services can provide virtualized computing resources such as virtual machines, storage, and networks, platforms for developing, running, and managing applications without the complexity of infrastructure management, and complete software applications over the Internet on a subscription basis.

Distributed computing services 93 provide large-scale processing using multiple interconnected computers or nodes to solve computational problems or perform tasks collectively. In distributed computing, the processing and storage capabilities of multiple machines are leveraged to work together as a unified system. Distributed computing services are designed to address problems that cannot be efficiently solved by a single computer or that require large-scale computational power. These services enable parallel processing, fault tolerance, and scalability by distributing tasks across multiple nodes.

Although described above as a physical device, computing device 10 can be a virtual computing device, in which case the functionality of the physical components herein described, such as processors 20, system memory 30, network interfaces 40, and other like components can be provided by computer-executable instructions. Such computer-executable instructions can execute on a single physical computing device, or can be distributed across multiple physical computing devices, including being distributed across multiple physical computing devices in a dynamic manner such that the specific, physical computing devices hosting such computer-executable instructions can dynamically change over time depending upon need and availability. In the situation where computing device 10 is a virtualized device, the underlying physical computing devices hosting such a virtualized computing device can, themselves, comprise physical components analogous to those described above, and operating in a like manner. Furthermore, virtual computing devices can be utilized in multiple layers with one virtual computing device executing within the construct of another virtual computing device. Thus, computing device 10 may be either a physical computing device or a virtualized computing device within which computer-executable instructions can be executed in a manner consistent with their execution by a physical computing device. Similarly, terms referring to physical components of the computing device, as utilized herein, mean either those physical components or virtualizations thereof performing the same or equivalent functions.

What is claimed is:

1. A system for task scheduling and financial planning, comprising:
- a computer system comprising at least one memory and at least one processor;
- a machine learning engine comprising a first plurality of programming instructions stored in the at least one memory and executable by the at least one processor, wherein the first plurality of programming instructions, when executed, cause the computer system to:
  - implement a recurrent neural network comprising feedback connections between layers, wherein the recurrent neural network maintains stateful information across multiple scheduling iterations to identify temporal patterns that stateless algorithms cannot detect;
  - apply genetic or evolutionary programming to optimize neural network parameters through successive generations of models;
  - generate scheduling optimization outputs based on temporal dependencies between scheduled events;
  - implement incremental learning techniques that preserve previously learned patterns while adapting to new user preferences derived from modifications to scheduled items; and
  - analyze communication patterns among a plurality of authorized stakeholders to optimize multi-party scheduling coordination among the plurality of authorized stakeholders; and
- a smart scheduling application comprising a second plurality of programming instructions stored in the at least one memory and executable by the at least one processor, wherein the second plurality of programming instructions, when executed, cause the computer system to:
  - maintain user profile data in a datastore with end-to-end encryption and client-controlled access permissions;
  - receive scheduling data from a plurality of heterogeneous data sources including unstructured communications and documents;
  - receive the scheduling optimization outputs generated by the machine learning engine;
  - organize events, obligations, tasks, and notifications in a calendar-based schedule using the scheduling optimization outputs with compartmentalized project workspaces; and
  - render the calendar-based schedule to a user device while maintaining comprehensive audit trails of all data access activities.

2. The system of claim 1, wherein the smart scheduling application further comprises a data fusion suite configured to:
- format outgoing data requests to external sources according to heterogeneous protocols;
- normalize and aggregate incoming data for processing by the scheduling application;
- process unstructured data sources including emails, text messages, and documents using optical character recognition and natural language processing to automatically extract scheduling-relevant information; and
- implement privacy protection mechanisms including data minimization protocols and automated retention policies to ensure compliance with applicable privacy regulations.

3. The system of claim 1, wherein the smart scheduling application is further configured to:
- detect scheduling conflicts and dependency chains among tasks; and
- visually render such conflicts and dependencies within the calendar-based schedule on the user device; and
- implement role-based access controls for multiple authorized stakeholders including financial advisors, attorneys, certified public accountants, and family members.

4. The system of claim 1, wherein the machine learning engine is further configured to:
- receive user modifications to scheduled items from the smart scheduling application; and
- retrain the recurrent neural network using incremental updates based on the user modifications; and
- analyze multi-party collaboration patterns to optimize stakeholder coordination and communication effectiveness.

5. The system of claim 1, further comprising a stakeholder management engine comprising a third plurality of programming instructions stored in the at least one memory and executable by the at least one processor, wherein the third plurality of programming instructions, when executed, cause the computer system to:
- implement comprehensive role-based access control systems for authorized parties including financial advisors, certified public accountants (CPAs), attorneys, estate planners, and family members involved in collaborative financial planning activities;
- maintain compartmentalized project workspaces that prevent cross-contamination of client information while enabling seamless collaboration among authorized stakeholders working on the same client engagement;

provide real-time communication transcription services that convert multi-party discussions into searchable text records integrated into client project files with appropriate access controls;

enable client oversight mechanisms that provide complete transparency into stakeholder collaboration activities while maintaining professional communication effectiveness; and generate comprehensive audit trails of all stakeholder interactions, permission changes, and collaborative decisions for regulatory compliance and client accountability.

6. The system of claim 1, wherein the smart scheduling application employs a transaction processing protocol configured to:

permit concurrent schedule modifications from multiple sources; and maintain schedule integrity and temporal consistency across such modifications while preventing unauthorized cross-contamination of client information between different projects.

7. The system of claim 1, wherein the smart scheduling application applies user-defined time budgeting constraints to scheduled items, the constraints being stored in the user profile data and enforced during schedule generation and further implements automated compliance frameworks configured to meet regulatory requirement including GDPR, CPRA, and financial industry privacy standards.

8. The system of claim 1, further comprising a natural language processing interface configured to:

receive user input in text or voice form describing desired schedule changes;

convert the input into structured modifications to the calendar-based schedule; and provide real-time transcription services for multi-party communications with authorized stakeholders.

9. The system of claim 1, wherein communications with external data sources and between authorized stakeholders are conducted over a secure communication channel comprising:

an adaptive protocol selection mechanism for optimizing data transfer;

an encrypted data pipeline configured to protect schedule and profile data; and compartmentalized communication channels that prevent unauthorized access to confidential client information.

10. The system of claim 1, further comprising a health analysis engine comprising a fourth plurality of programming instructions stored in the at least one memory and executable by the at least one processor, wherein the fourth plurality of programming instructions, when executed, cause the computer system to:

receive biometric data from one or more wearable devices associated with the user; and modify scheduling outputs to avoid task overload or excessive stress indicators based on the biometric data.

11. A method for task scheduling and financial planning, comprising the steps of:

implementing a machine learning engine comprising a recurrent neural network which further comprise feedback connections between layers, wherein the recurrent neural network maintains stateful information across multiple scheduling iterations to identify temporal patterns that stateless algorithms cannot detect;

applying genetic or evolutionary programming to optimize neural network parameters through successive generations of models, wherein the genetic programming implements crossover and mutation operations that adapt to the specific scheduling domain;

generating scheduling optimization outputs based on temporal dependencies between scheduled events;

implementing incremental learning techniques that preserve previously learned patterns while adapting to new user preferences derived from modifications to scheduled items;

analyzing communication patterns among a plurality of authorized stakeholders to optimize multi-party scheduling coordination among the plurality of authorized stakeholders;

maintaining a plurality of user profiles data in a datastore with end-to-end encryption and client-controlled access permissions;

receiving scheduling data from a plurality of heterogeneous data sources including unstructured communications and documents;

transmitting the scheduling optimization outputs generated by the machine learning engine to a smart scheduling application;

organizing a plurality of events, obligations, tasks, and notifications in a calendar-based schedule with compartmentalized project workspaces within the smart scheduling application based on the scheduling optimization outputs; and rendering the calendar-based schedule to a user device while maintaining comprehensive audit trails of all data access activities.

12. The method of claim 11, further comprising the step of:

normalizing data received from the plurality of heterogeneous data sources and formatting outgoing data requests to external systems according to their respective communication protocols;

processing unstructured data using optical character recognition and natural language processing to automatically identify and extract scheduling-relevant information from emails, text messages, and documents; and implementing automated data retention and privacy protection policies with data minimization protocols to ensure compliance with applicable regulations including GDPR, CPRA, and financial industry standards.

13. The method of claim 11, further comprising the steps of:

implementing comprehensive role-based access control for authorized stakeholders including financial advisors, certified public accountants, attorneys, estate planners, and family members involved in collaborative financial planning activities;

maintaining compartmentalized project workspaces that prevent cross-contamination of client information while enabling seamless collaboration among authorized parties;

providing real-time communication transcription services that convert multi-party discussions into searchable text records; and enabling client oversight mechanisms that provide complete transparency into stakeholder collaboration activities.

14. The method of claim 11, further comprising the steps of:

receiving user modifications to scheduled items via the smart scheduling application from multiple authorized stakeholders;

updating the recurrent neural network based on the modifications to improve future scheduling outputs;

analyzing stakeholder collaboration patterns and communication effectiveness to optimize multi-party coordination; and generating comprehensive audit trails of all stakeholder interactions, permission changes, and collaborative decisions.

15. The method of claim 11, further comprising the steps of:

detecting scheduling conflicts and task dependency chains among multiple authorized stakeholders;

implementing automated conflict resolution protocols that prioritize changes based on predefined hierarchy rules and stakeholder authority levels; and rendering visual representations of conflicts and dependencies within compartmentalized project workspaces accessible to authorized parties.

16. The method of claim 11, further comprising the step of:

permitting concurrent modifications to the calendar-based schedule from authorized stakeholders and maintaining schedule consistency by applying transaction processing protocols that resolve conflicts, preserve temporal integrity, and prevent unauthorized cross-contamination of client information between different projects while enabling seamless multi-party collaboration.

17. The method of claim 11, further comprising the steps of:

receiving time budgeting constraints from user profiles and applying the constraints to limit time allocation for scheduled items based on task categories and stakeholder-specific preferences;

implementing automated compliance frameworks that enforce regulatory requirements including financial industry standards and privacy regulations;

providing clients with dynamic control over data sharing permissions that can be modified or revoked in real-time; and maintaining end-to-end encryption for all multi-party communications and document sharing activities.

18. The method of claim 11, further comprising the steps of:

receiving natural language input describing desired schedule changes from multiple authorized stakeholders;

parsing the input using natural language processing and modifying the calendar-based schedule based on parsed intent while respecting role-based access permissions;

providing real-time transcription services for multi-party communications including conference calls, video meetings, and collaborative planning sessions; and integrating transcribed communications into appropriate client project files with proper access controls and audit trail documentation.

19. The method of claim 11, wherein communications with external data sources and between authorized stakeholders are conducted over secure channels that include:

an adaptive protocol selection mechanism for optimizing data transmission;

encrypted data pipelines configured to prevent unauthorized access to schedule, profile, or project information;

compartmentalized communication channels that maintain strict separation between different client projects; and automated breach detection and notification systems that alert relevant parties and regulatory authorities in the event of unauthorized data access.

20. The method of claim 11, further comprising the steps of:

receiving biometric or physiological data from a wearable device associated with users;

modifying the calendar-based schedule in response to health indicators while maintaining HIPAA-compliant data handling procedures;

coordinating health-related scheduling adjustments with authorized healthcare providers and family members through secure, role-based communication channels; and integrating health analysis outcomes with multi-party stakeholder coordination to ensure collaborative planning activities consider user wellness factors and time management constraints.

* * * * *